US010952235B2

(12) United States Patent
Zhou et al.

(10) Patent No.: US 10,952,235 B2
(45) Date of Patent: *Mar. 16, 2021

(54) RESOURCE IDENTIFICATION TECHNIQUES FOR COMBINING MULTIPLE INSTANCES OF SYSTEM INFORMATION

(71) Applicant: QUALCOMM Incorporated, San Diego, CA (US)

(72) Inventors: Yan Zhou, San Diego, CA (US); Tao Luo, San Diego, CA (US); Xiao Feng Wang, San Diego, CA (US); Xiaoxia Zhang, San Diego, CA (US); Makesh Pravin John Wilson, San Diego, CA (US); Sony Akkarakaran, Poway, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/267,956

(22) Filed: Feb. 5, 2019

(65) Prior Publication Data

US 2019/0313434 A1 Oct. 10, 2019

Related U.S. Application Data

(60) Provisional application No. 62/653,293, filed on Apr. 5, 2018.

(51) Int. Cl.
*H04W 72/12* (2009.01)
*H04W 24/08* (2009.01)
(Continued)

(52) U.S. Cl.
CPC ....... *H04W 72/1289* (2013.01); *H04W 24/08* (2013.01); *H04W 56/001* (2013.01); *H04W 72/085* (2013.01)

(58) Field of Classification Search
CPC . H04W 48/12; H04W 72/1289; H04W 24/08; H04W 56/001; H04W 72/085;
(Continued)

(56) References Cited

U.S. PATENT DOCUMENTS 10,506,588 B2 * 12/2019 Kim ...................... H04W 48/10
10,517,093 B2 * 12/2019 Abdoli .............. H04W 72/0453
(Continued)

OTHER PUBLICATIONS

International Search Report and Written Opinion—PCT/US2019/016767—ISA/EPO—dated Apr. 8, 2019.
(Continued)

*Primary Examiner* — Man U Phan
(74) *Attorney, Agent, or Firm* — Linda G. Gunderson; Holland & Hart LLP

(57) ABSTRACT

Methods, systems, and devices for wireless communications are described for transmissions of multiple instances of control information, such as remaining minimum system information (RMSI) that may be used for system access by a user equipment (UE). The multiple instances of the control information may be transmitted in a number of monitoring occasions that may be monitored by a UE, and within the monitoring occasions, the control information may be transmitted using different time locations, frequency locations, or combinations thereof. The locations may be identified based at least in part on one or more parameters associated with at least a first monitoring occasion. The one or more parameters may include an identification parameter associated with the base station or monitoring occasion, an index value associated with the monitoring occasion, a frequency parameter associated with the monitoring occasion, a control information multiplexing pattern, or any combination thereof.

28 Claims, 22 Drawing Sheets

(51) Int. Cl.
*H04W 56/00* (2009.01)
*H04W 72/08* (2009.01)

(58) Field of Classification Search
CPC ..... H04W 72/12; H04W 72/08; H04W 56/00; H04L 5/0053; H04L 5/0092; H04L 5/0012
USPC .......................................................... 370/329
See application file for complete search history.

(56) References Cited

U.S. PATENT DOCUMENTS

| | | | | |
|---|---|---|---|---|
| 10,547,413 | B2* | 1/2020 | Seo | H04L 5/0091 |
| 10,582,486 | B2* | 3/2020 | Nam | H04W 24/08 |
| 2018/0324843 | A1* | 11/2018 | Lee | H04W 72/1289 |
| 2018/0376511 | A1 | 12/2018 | Tsai et al. | |
| 2019/0020448 | A1* | 1/2019 | John Wilson | H04L 5/005 |
| 2019/0158205 | A1 | 5/2019 | Sheng et al. | |
| 2019/0158326 | A1 | 5/2019 | Liao et al. | |
| 2019/0159180 | A1* | 5/2019 | Ly | H04L 5/0048 |
| 2019/0159226 | A1* | 5/2019 | Ly | H04L 5/0048 |
| 2019/0230534 | A1* | 7/2019 | John Wilson | H04W 24/08 |
| 2019/0313428 | A1* | 10/2019 | Zhou | H04W 48/12 |
| 2019/0356524 | A1* | 11/2019 | Yi | H04L 5/0094 |
| 2019/0357185 | A1* | 11/2019 | Kwak | H04L 5/0053 |
| 2020/0092946 | A1* | 3/2020 | Xiong | H04L 1/0071 |

OTHER PUBLICATIONS

LG Electronics: "RMSI delivery and CORESET configuration", 3GPP Draft; 3GPP TSG RAN WG1 Meeting #92, R1-1802191 LG_RMSI CORESET Configuration_Final, 3rd Generation Partnership Project (3GPP), Mobile Competence Centre, 650, Route Des Lucioles, F-06921, Sophia-Antipolis, Cedex, France, vol. RAN WG1, No. Athens, Greece; Feb. 26, 2018-Mar. 2, 2018, Feb. 16, 2018 (Feb. 16, 2018), XP051397196, 21 Pages, Retrieved from the Internet: URL:http://www.3gpp.org/ftp/tsg%5Fran/WG1%5FRL1/TSGR1%5F92/Docs/ [retrieved on Feb. 16, 2018].

VIVO: "Discussion on Remaining Minimum System Information", 3GPP Draft; 3GPP TSG RAN WG1 Meeting #92, 3GPP TSG RAN WG1 Meeting #92, R1-1801508 Discussion on Remaining Minimum System Information, 3rd Generation Partnership Project (3GPP), Mobile Competence Centre, 650, Route Des Lucioles, F-06921 Sophia-Antipolis CEDE, vol. RAN WG1, No. Greece, Athens; Feb. 26, 2018-Mar. 2, 2018, Feb. 15, 2018 (Feb. 15, 2018), XP051396760, 8 Pages, Retrieved from the Internet: URL:http://www.3gpp.org/ftp/tsg%5Fran/WG1%5FRL1/TSGR1%5F92/Docs/ [retrieved on Feb. 15, 2018].

* cited by examiner

RESOURCE IDENTIFICATION TECHNIQUES FOR COMBINING MULTIPLE INSTANCES OF SYSTEM INFORMATION

CROSS REFERENCES

The present application for patent claims the benefit of U.S. Provisional Patent Application No. 62/653,293 by ZHOU, et al., entitled "RESOURCE IDENTIFICATION TECHNIQUES FOR COMBINING MULTIPLE INSTANCES OF SYSTEM INFORMATION," filed Apr. 5, 2018, assigned to the assignee hereof, and expressly incorporated herein.

BACKGROUND

The following relates generally to wireless communications, and more specifically to resource identification techniques for combining multiple instances of system information.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A base station may send control transmissions that may allow one or more UEs to identify various pieces of system information that may be used for system access. In some systems, a base station may transmit one or more synchronization signal blocks (SSBs) to one or more UEs, which may include system information. The UEs may be configured to monitor for system information within a search space, which may include multiple search candidates. For instance, each search space may include multiple control resource sets (CORESETs) containing multiple control channel elements (CCEs). The UE may be configured to monitor one or more search candidates in the search space, and may blindly decode the one or more CCEs of the search candidate to receive the control information. In some cases, one or more UEs may have channel conditions that may lead to lower reliability in receiving and decoding such control transmissions. Techniques for enhancing the likelihood of receiving control transmissions thus may be desirable and may enhance system efficiency and reliability.

SUMMARY

The described techniques relate to improved methods, systems, devices, and apparatuses that support control information combining in wireless communications. Various of the described techniques provide for transmissions of multiple instances of control information (e.g., remaining minimum system information (RMSI)) scheduling information that may be used for system access by a user equipment (UE). The multiple instances of the control information may be combined at the UE to enhance the likelihood of successful decoding of the control information.

In some cases, multiple instances of the control information may be transmitted in a number of monitoring occasions that may be monitored by a UE. Within the monitoring occasions, the control information may be transmitted using different time locations, frequency locations, or combinations thereof. In some cases, the locations may be identified based at least in part on one or more parameters associated with at least a first monitoring occasion. A base station may transmit multiple instances of the control information in the identified locations, which may be monitored by the UE, with signals from the multiple instances combined to generate a combined signal. The UE may then attempt to decode the combined signal to obtain the control information. In some cases, the one or more parameters include an identification parameter associated with the base station or monitoring occasion, an index value associated with the monitoring occasion, a frequency parameter associated with the monitoring occasion, a control information multiplexing pattern, or any combination thereof.

A method of wireless communication is described. The method may include identifying a set of monitoring occasions available for transmission of RMSI scheduling information from a base station, determining, based on one or more parameters associated with at least a first monitoring occasion, two or more time locations, frequency locations, or combinations thereof, that are to be monitored for RMSI scheduling information, combining signals received in the two or more locations to generate a combined RMSI signal, and attempting to decode the combined RMSI signal to obtain the RMSI scheduling information.

An apparatus for wireless communication is described. The apparatus may include a processor, memory in electronic communication with the processor, and instructions stored in the memory. The instructions may be executable by the processor to cause the apparatus to identifying a set of monitoring occasions available for transmission of RMSI scheduling information from a base station, determining, based on one or more parameters associated with at least a first monitoring occasion, two or more time locations, frequency locations, or combinations thereof, that are to be monitored for RMSI scheduling information, combining signals received in the two or more locations to generate a combined RMSI signal, and attempting to decode the combined RMSI signal to obtain the RMSI scheduling information.

Another apparatus for wireless communication is described. The apparatus may include identifying a set of monitoring occasions available for transmission of RMSI scheduling information from a base station, determining, based on one or more parameters associated with at least a first monitoring occasion, two or more time locations, frequency locations, or combinations thereof, that are to be monitored for RMSI scheduling information, combining signals received in the two or more locations to generate a combined RMSI signal, and attempting to decode the combined RMSI signal to obtain the RMSI scheduling information.

A non-transitory computer-readable medium storing code for wireless communication is described. The code may include instructions executable by a processor to identifying a set of monitoring occasions available for transmission of RMSI scheduling information from a base station, determining, based on one or more parameters associated with at least a first monitoring occasion, two or more time locations, frequency locations, or combinations thereof, that are to be monitored for RMSI scheduling information, combining signals received in the two or more locations to generate a combined RMSI signal, and attempting to decode the combined RMSI signal to obtain the RMSI scheduling information.

In some examples of the method, apparatuses, and non-transitory computer-readable medium described herein, the RMSI scheduling information may be carried in a PDCCH transmission. In some examples of the method, apparatuses, and non-transitory computer-readable medium described herein, the set of monitoring occasions available for transmission of RMSI scheduling information may be scheduled by a physical broadcast channel (PBCH) transmission associated with a given synchronization signal block (SSB) ID.

In some examples of the method, apparatuses, and non-transitory computer-readable medium described herein, the one or more parameters include, for each of the set of monitoring occasions, one or more of an identification parameter associated with the base station or monitoring occasion; an index value associated with the monitoring occasion; a frequency parameter associated with the monitoring occasion; a RMSI multiplexing pattern; or any combinations thereof.

In some examples of the method, apparatuses, and non-transitory computer-readable medium described herein, the determining may include operations, features, means, or instructions for identifying a fixed frequency location of the RMSI scheduling information relative to a frequency bandwidth used for control channel transmissions within each monitoring occasion and determining that the first monitoring occasion and one or more other monitoring occasions are to be monitored for the RMSI scheduling information. In some examples of the method, apparatuses, and non-transitory computer-readable medium described herein, the fixed frequency location of the RMSI scheduling information may be based on an aggregation level for RMSI scheduling information transmissions, an index value of a control channel used to transmit the RMSI scheduling information, or combinations thereof. In some examples of the method, apparatuses, and non-transitory computer-readable medium described herein, the fixed frequency location of the RMSI scheduling information may be based on a starting control channel element (CCE) index of a control channel transmission containing the RMSI scheduling information. In some examples of the method, apparatuses, and non-transitory computer-readable medium described herein, the fixed frequency location of the RMSI scheduling information may be determined based on a set of occupied resource element groups (REGs) of a control resource set containing the RMSI scheduling information.

In some examples of the method, apparatuses, and non-transitory computer-readable medium described herein, the determining may include operations, features, means, or instructions for identifying a frequency hopping pattern of a control channel carrying RMSI scheduling information relative to a frequency bandwidth of a control resource set used for control channel transmissions within each monitoring occasion. In some examples of the method, apparatuses, and non-transitory computer-readable medium described herein, the frequency hopping pattern of the control channel carrying RMSI scheduling info across the monitoring occasions is determined, for each monitoring occasion, based at least in part on a synchronization signal block (SSB) identification of control information used to schedule the monitoring occasions, a cell identification associated with the base station, a sequence frame number (SFN) of the monitoring occasion, a first slot index of a carrying frame of the monitoring occasion, a first symbol index of a carrying slot of the monitoring occasion, a sub-carrier spacing (SCS) of a downlink control channel carrying the RMSI, a SCS of broadcast channel that schedules the monitoring occasions, a SSB and RMSI multiplexing pattern, a frequency bandwidth and number of symbols of a control resource set used for the downlink control channel, an index value of the monitoring occasion configuration, or any combinations thereof.

In some examples of the method, apparatuses, and non-transitory computer-readable medium described herein, the frequency hopping pattern of the control channel carrying RMSI scheduling information across the monitoring occasions indicates, based at least in part an index of a control channel carrying the RMSI, scheduling information within the control resource set in each monitoring occasion. In some examples of the method, apparatuses, and non-transitory computer-readable medium described herein, the frequency hopping pattern of the control channel carrying RMSI scheduling information across the monitoring occasions indicates, based at least in part an aggregation level of control channel carrying the RMSI, scheduling information within the control resource set in each monitoring occasion.

In some examples of the method, apparatuses, and non-transitory computer-readable medium described herein, the determining may include operations, features, means, or instructions for identifying one or more fixed monitoring occasions for transmission of two or more instances of the RMSI scheduling information and determining a frequency location within each monitoring occasion to be monitored for the RMSI scheduling information. In some examples of the method, apparatuses, and non-transitory computer-readable medium described herein, the one or more fixed monitoring occasions may be identified based on a configured multiplexing pattern of monitoring occasions. In some examples of the method, apparatuses, and non-transitory computer-readable medium described herein, the one or more fixed monitoring occasions may be identified based on a predetermined pattern of monitoring occasions within a time window.

In some examples of the method, apparatuses, and non-transitory computer-readable medium described herein, the determining may include operations, features, means, or instructions for identifying one or more candidate monitoring occasions for transmission of two or more instances of the RMSI scheduling information and blind decoding each of the one or more candidate monitoring occasions to determine a presence of RMSI. In some examples of the method, apparatuses, and non-transitory computer-readable medium described herein, the one or more candidate monitoring occasions may be a subset of the set of monitoring occasions based on a number of occasions RMSI to be transmitted during a time window. In some examples of the method, apparatuses, and non-transitory computer-readable medium described herein, the RMSI control information may have a known frequency location within each monitoring occasion and a partially known time location within monitoring occasions, may have a fixed time location within monitoring occasions and a partially known frequency location within each monitoring occasion, or combinations thereof.

A method of wireless communication is described. The method may include identifying a set of occasions available for transmission of RMSI scheduling information to a UE, determining, based on one or more parameters associated with at least a first occasion of the set of occasions, two or more time locations, frequency locations, or combinations thereof, for transmission of RMSI scheduling information, and transmitting two or more instances of the RMSI scheduling information via the two or more locations.

An apparatus for wireless communication is described. The apparatus may include a processor, memory in electronic communication with the processor, and instructions stored in the memory. The instructions may be executable by the processor to cause the apparatus to identifying a set of occasions available for transmission of RMSI scheduling information to a UE, determining, based on one or more parameters associated with at least a first occasion of the set of occasions, two or more time locations, frequency locations, or combinations thereof, for transmission of RMSI scheduling information, and transmitting two or more instances of the RMSI scheduling information via the two or more locations.

Another apparatus for wireless communication is described. The apparatus may include identifying a set of occasions available for transmission of RMSI scheduling information to a UE, determining, based on one or more parameters associated with at least a first occasion of the set of occasions, two or more time locations, frequency locations, or combinations thereof, for transmission of RMSI scheduling information, and transmitting two or more instances of the RMSI scheduling information via the two or more locations.

A non-transitory computer-readable medium storing code for wireless communication is described. The code may include instructions executable by a processor to identifying a set of occasions available for transmission of RMSI scheduling information to a UE, determining, based on one or more parameters associated with at least a first occasion of the set of occasions, two or more time locations, frequency locations, or combinations thereof, for transmission of RMSI scheduling information, and transmitting two or more instances of the RMSI scheduling information via the two or more locations.

In some examples of the method, apparatuses, and non-transitory computer-readable medium described herein, the one or more parameters include, for each of the set of occasions, one or more of an identification parameter associated with a base station or occasion; an index value associated with the occasion; a frequency parameter associated with the occasion; a RMSI multiplexing pattern; or any combinations thereof.

In some examples of the method, apparatuses, and non-transitory computer-readable medium described herein, the determining may include operations, features, means, or instructions for identifying a fixed frequency location of the RMSI relative to a frequency bandwidth used for control channel transmissions within each of the set of occasions and determining RMSI scheduling information is to be transmitted in the first occasion and one or more other occasions. In some examples of the method, apparatuses, and non-transitory computer-readable medium described herein, the fixed frequency location of the RMSI may be determined based on an aggregation level for RMSI scheduling information transmissions, an index value of a control channel used to transmit the RMSI scheduling information, or combinations thereof. In some examples of the method, apparatuses, and non-transitory computer-readable medium described herein, the fixed frequency location of the RMSI may be determined based on a starting control channel element (CCE) index of a control channel transmission containing the RMSI scheduling information. In some examples of the method, apparatuses, and non-transitory computer-readable medium described herein, the fixed frequency location of the RMSI may be determined based on a set of occupied resource element groups (REGs) of a control resource set containing the RMSI scheduling information.

In some examples of the method, apparatuses, and non-transitory computer-readable medium described herein, the determining may include operations, features, means, or instructions for identifying a frequency hopping pattern of the RMSI relative to a frequency bandwidth used for control channel transmissions within each occasions and determining that the RMSI scheduling information is to be transmitted in the first occasion and one or more other occasions based on the frequency hopping pattern. In some examples of the method, apparatuses, and non-transitory computer-readable medium described herein, the frequency hopping pattern of the control channel carrying RMSI scheduling info across the monitoring occasions is determined, for each monitoring occasion, based at least in part on a synchronization signal block (SSB) identification of control information used to schedule the monitoring occasions, a cell identification associated with a base station, a sequence frame number (SFN) of the monitoring occasion, a first slot index of a carrying frame of the monitoring occasion, a first symbol index of a carrying slot of the monitoring occasion, a sub-carrier spacing (SCS) of a downlink control channel carrying the RMSI, a SCS of broadcast channel that schedules the monitoring occasions, a SSB and RMSI multiplexing pattern, a frequency bandwidth and number of symbols of a control resource set used for the downlink control channel, an index value of the monitoring occasion configuration, or any combinations thereof. In some examples of the method, apparatuses, and non-transitory computer-readable medium described herein, the frequency hopping pattern of the control channel carrying RMSI scheduling information across the monitoring occasions indicates, based at least in part an index of control channel carrying the RMSI, scheduling information within the control resource set in each monitoring occasion.

In some examples of the method, apparatuses, and non-transitory computer-readable medium described herein, the determining may include operations, features, means, or instructions for identifying one or more fixed occasions for transmission of two or more instances of the RMSI scheduling information and determining a frequency location within each occasion for transmission of the RMSI scheduling information. In some examples of the method, apparatuses, and non-transitory computer-readable medium described herein, the one or more fixed occasions may be identified based on a configured multiplexing pattern of occasions. In some examples of the method, apparatuses, and non-transitory computer-readable medium described herein, the one or more fixed occasions may be identified based on a predetermined pattern of occasions within a time window.

In some examples of the method, apparatuses, and non-transitory computer-readable medium described herein, the determining may include operations, features, means, or instructions for identifying a set of candidate occasions for transmission of two or more instances of the RMSI scheduling information and selecting a subset of the set of candidate occasions for transmission of the RMSI scheduling information. In some examples of the method, apparatuses, and non-transitory computer-readable medium described herein, the subset of the set of candidate occasions may be randomly selected based on a number of occasions in which the RMSI scheduling information is to be transmitted during a time window.

In some examples of the method, apparatuses, and non-transitory computer-readable medium described herein, the RMSI scheduling information may have a fixed frequency location within each occasion and a partially known time location within each occasion or across occasions, may have a fixed time location within each occasion or across occasions and a partially known frequency location within each occasion, or combinations thereof.

DETAILED DESCRIPTION

Figure 1:
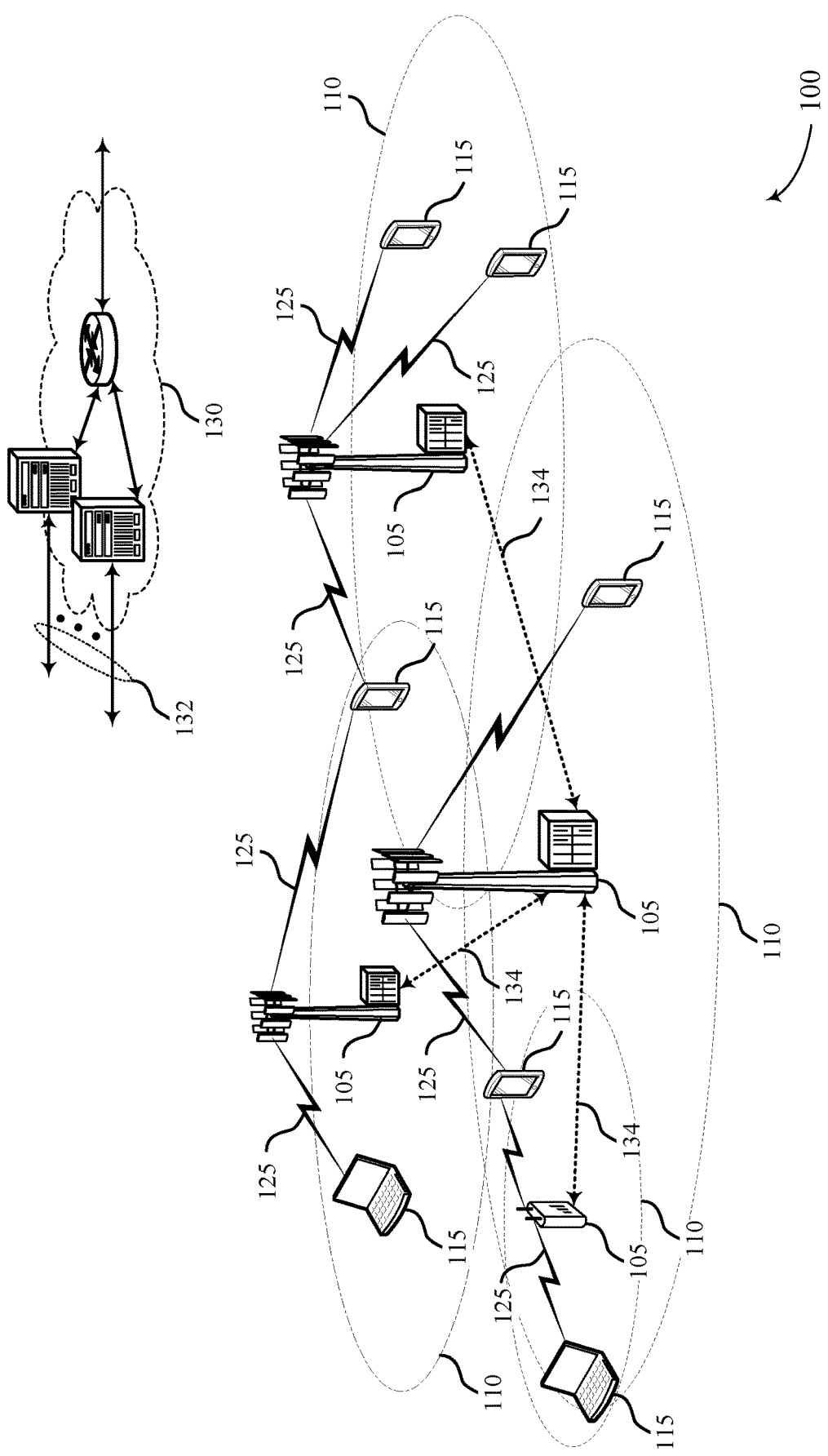
FIG. 1 illustrates an example of a wireless communications system that supports resource identification techniques for combining multiple instances of system information in accordance with aspects of the present disclosure.

Various techniques provided herein provide for signaling of base station support for control information combining. A user equipment (UE) may combine multiple instances of a control information signal and attempt to decode the control information from the combined signals. Such combining may enhance the likelihood of successful decoding of the control information at the UE, and enhance overall system efficiency and reliability. In some cases, a base station may transmit synchronization signal block (SSB) transmission that may include one or more reference signals and control information, such as remaining minimum system information (RMSI) that may be used by a UE (e.g., in conjunction with system information provided in a master information block (MIB)) for initial system access. In some cases, the indication that combining of multiple instances of control information is supported by the base station may be provided to the UE. The UE may identify resource locations of the multiple instances of the control information, monitor the identified resource locations, and combine the signals into a combined resource information signal for decoding.

In some cases, the locations may be identified based at least in part on one or more parameters associated with at least a first monitoring occasion. In some cases, the one or more parameters include an identification parameter associated with the base station or monitoring occasion, an index value associated with the monitoring occasion, a frequency parameter associated with the monitoring occasion, a control information multiplexing pattern, or any combination thereof. In some cases, the one or more parameters may be used to identify a fixed frequency location of the control information relative to a frequency bandwidth used for control channel transmissions within each monitoring occasion. In further cases, the one or more parameters may be used to identify a frequency hopping pattern of the control information relative to a frequency bandwidth used for control channel transmissions within each monitoring occasion. In some cases, the one or more parameters may be used to identify one or more fixed monitoring occasions for transmission of two or more instances of the control information, which may be based at least in part on a configured multiplexing pattern of monitoring occasions. Additionally or alternatively, the control information may have a fixed frequency location within each monitoring occasion and a partially known time location within each monitoring occasion or across monitoring occasions, have a fixed time location within each monitoring occasion or across monitoring occasions and a partially known frequency location within each monitoring occasion, or combinations thereof.

Aspects of the disclosure are initially described in the context of a wireless communications system. Various combining indications and combining techniques are then described in accordance with various teachings provided herein. Aspects of the disclosure are further illustrated by and described with reference to apparatus diagrams, system diagrams, and flowcharts that relate to resource identification techniques for combining multiple instances of system information.

FIG. 1 illustrates an example of a wireless communications system 100 that supports control information combining techniques in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Base stations 105 may, in some cases, transmit multiple instances of control information that may be combined at one or more UEs 115 to enhance the likelihood of successful reception at the UEs 115.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data.

In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, as indicated above, UEs 115 may receive and decode control information provided by base stations 105 for initial system access, or for continuing system access. For example, a base station 105 may transmit RMSI that may be used by a UE 115 for initial system access. In cases where a UE 115 is at or near a cell edge or otherwise in a location where channel quality may be relatively poor, the UE 115 may be less likely to successfully receive and decode RMSI, and system access may be delayed until such control information is successfully decoded. In order to enhance the likelihood of successful reception and decoding of such control information, some base stations 105 may transmit multiple instances of the control information that may be combined at such UEs 115, with the combined signal used for decoding of the control information. Various techniques provided herein provide for identification of resource locations of the multiple instances of the RMSI (or other control information), which a base station 105 may use for RMSI transmissions and which a UE 115 may monitor and combine for RMSI decoding. Such techniques may allow higher reliability of receipt of the RMSI for UEs 115 that may be located at a cell edge or that may otherwise have relatively poor channel conditions.

Figure 2:
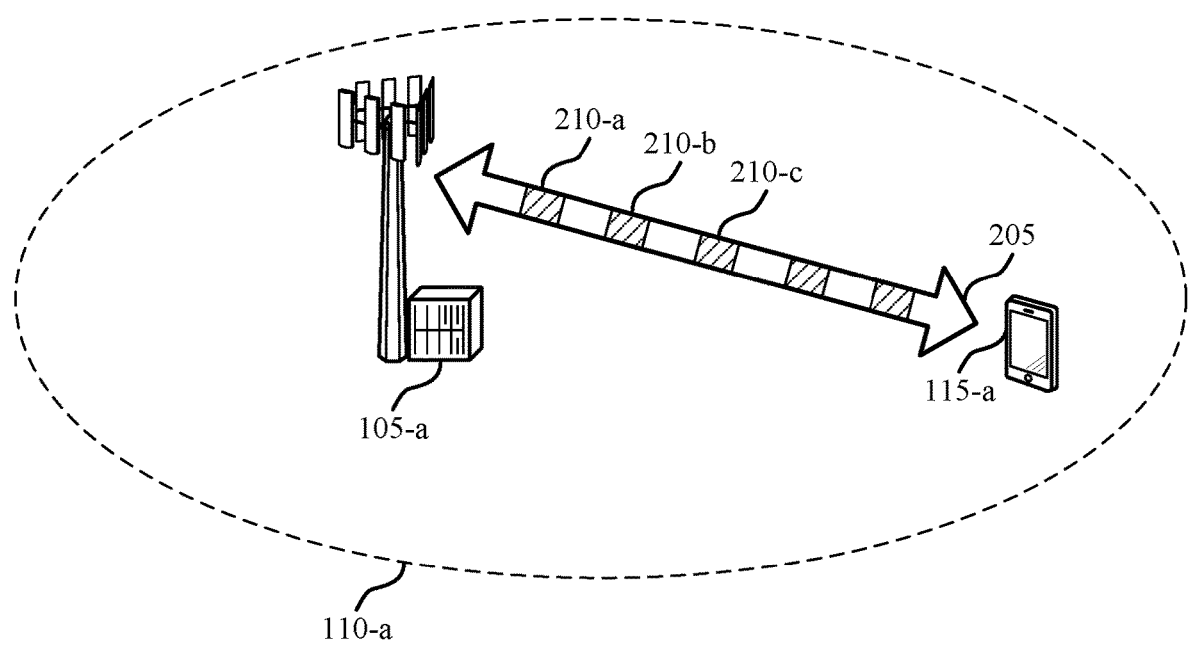
FIG. 2 illustrates an example of a wireless communication system that supports resource identification techniques for combining multiple instances of system information in accordance with aspects of the present disclosure.

FIG. 2 illustrates an example of a wireless communication system 200 that supports resource identification techniques for combining multiple instances of system information in accordance with aspects of the present disclosure. In some examples, wireless communication system 200 may implement aspects of wireless communications system 100. In some examples, the wireless communication system 200 may include a base station 105-*a* and UE 115-*a*, which may be examples of the corresponding devices as described with reference to FIG. 1. UE 115-*a* may communicate with the base station 105-*a* within a coverage area 110-*a*.

In some examples, the UE 115-*a* may utilize SSBs 210 to perform cell acquisition procedures with base station 105-*a*. For example, the UE 115-*a* may utilize PSS and SSS transmissions within a SSB 210 for synchronizing with a cell. In one example, synchronization signals may be transmitted over a carrier 205 for a cell. The synchronization signals may be conveyed using established synchronization sequences. In some cases, the UE 115-*a* may receive a synchronization signal (e.g., PSS/SSS) for synchronizing with a cell served by the base station 105-*a*, and may receive physical broadcast channel (PBCH) information via the SSB 210. In the example of FIG. 2, the base station 105-*a* may transmit multiple different SSBs 210, a same SSB multiple times, or combinations thereof, including a first instance of a SSB 210-*a*, a second instance of a SSB 210-*b*, and a third instance of a SSB 210-*c*. In some cases, the SSBs 210 may be used by the UE 115-*a* for timing synchronization and detection of a cell ID. For example, the UE 115-*a* may utilize the SSB 210 to determine an ID associated with the cell served by the base station 105-*a*.

In some cases, as indicated above, in order to enhance the likelihood of successful reception and decoding of such control information provided via SSBs 210 (e.g., RMSI related information), base station 105-*a* may transmit multiple instances of the control information that may be combined at UE 115-*a*, with the combined signal used for decoding of the control information. In some cases, the control information may include RMSI related information, which may include RMSI physical downlink control channel (PDCCH) information, RMSI physical uplink control channel (PUCCH), or combinations thereof. Various examples provided herein describe that RMSI may be transmitted by the base station 105-*a* and combined at the UE 115-*a*, and it is to be understood when referencing RMSI, reference is made to RMSI related information which may include RMSI PDCCH and RMSI PDSCH. Furthermore, while various examples describe RMSI, techniques provided herein may apply to other types of control information or other types of transmissions within the wireless communication system.

In some cases, signaling may be transmitted from the base station 105-*a* that indicates multiple instances of RMSI may be combined at the UE 115-*a*. The UE 115-*a* may receive the indication that multiple instances of RMSI are transmitted, may identify downlink transmission resources configured for the RMSI transmission, and may combine signals received in each of two or more RMSI instances to generate a combined RMSI signal that may be decoded to determine the RMSI. In order to combine the RMSI across occasions, the UE 115-*a* may identify monitoring occasions that are carrying the RMSI, as well as a frequency location for the RMSI in a monitoring occasion. If the UE 115-*a* is unable to identify resource locations for multiple instances or RMSI, the UE 115-*a* may have to blindly test different time/frequency location combination hypotheses, which may significantly affect power consumption and decoding latency at the UE 115-*a*.

Various techniques provided herein provide for identification of wireless resources that contain such control information. In some cases, to enhance reception of RMSI at the UE 115-*a* and reduce UE 115-*a* blind decoding efforts, RMSI time/frequency locations may be known or partially known to the UE 115-*a* in cases where RMSI combining is supported. In some cases, the UE 115-*a* may identify resource locations of the multiple instances of the RMSI based at least in part on one or more parameters associated with at least a first monitoring occasion. In some cases, the one or more parameters include an identification parameter associated with the base station 105-*a* or monitoring occasion, an index value associated with the monitoring occasion, a frequency parameter associated with the monitoring occasion, a control information multiplexing pattern, or any combination thereof.

In some cases, the one or more parameters may be used to identify a fixed frequency location of the control information relative to a frequency bandwidth used for control channel transmissions within each monitoring occasion. In further cases, the one or more parameters may be used to identify a frequency hopping pattern of the control information relative to a frequency bandwidth used for control channel transmissions within each monitoring occasions. In some cases, the one or more parameters may be used to identify one or more fixed monitoring occasions for transmission of two or more instances of the control information, which may be based at least in part on a configured multiplexing pattern of monitoring occasions. Additionally or alternatively, the control information may have a fixed frequency location within each monitoring occasion and a partially known time location within each monitoring occasion or across monitoring occasions, have a fixed time location within each monitoring occasion or across monitoring occasions and a partially known frequency location within each monitoring occasion, or combinations thereof. In some cases, location-determining factors may include: SSB ID, Cell ID, an occasion's sequence frame number (SFN), an occasion's 1st slot index in the carrying frame, an occasion's 1st symbol index in the carrying slot, sub-carrier spacing (SCS) of the RMSI PDCCH, SCS of a physical broadcast channel (PBCH) scheduling RMSI PDCCH, a multiplexing pattern index, a bandwidth of the CORESET, a number of symbols of the CORES SET, an occasion configuration index, or combinations thereof.

Figure 3:
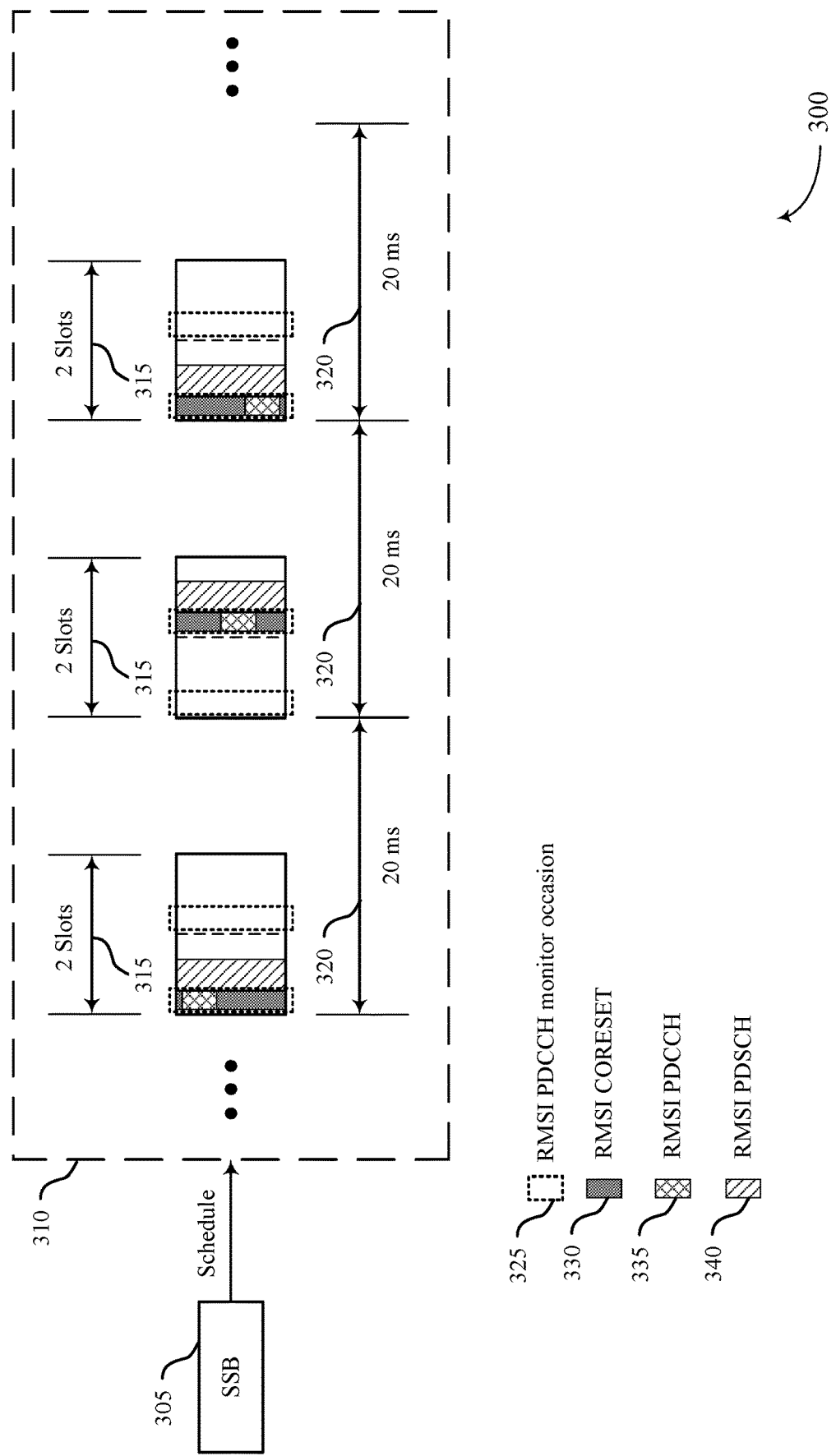
FIG. 3 illustrates an example of SSB resources that support resource identification techniques for combining multiple instances of system information in accordance with aspects of the present disclosure.

FIG. 3 illustrates an example of SSB resources 300 that support resource identification techniques for combining multiple instances of system information in accordance with aspects of the present disclosure. In some examples, SSB resources 300 may implement aspects of wireless communications system 100. In the example of FIG. 3, SSB 305 may have a schedule configuration 310 that provides a number of periodic RMSI PDCCH monitoring windows 320. In some cases, the PBCH for a given SSB ID may schedule such periodic RMSI PDCCH monitor windows with a period of 20 ms. In some cases, one of a number of available multiplexing patterns may be established for SSB 305. For example, a SSB and RMSI multiplex pattern 1 may provide that each RMSI PDCCH monitoring window 320 has two slots 315, and each slot has a RMSI PDCCH monitor occasion 325 (which may also be referred to as a "monitoring occasion") where RMSI PDCCH may appear. In other examples, a SSB and RMSI multiplex pattern 2 or 3, may provide that each RMSI PDCCH monitoring window 320 only has a single RMSI PDCCH monitor occasion 325. After decoding PBCH, a UE may look for potential RMSI PDCCH in the indicated RMSI PDCCH monitor occasions 325. The RMSI PDCCH monitor occasion 325, if RMSI is present, may include RMSI CORSET 330 and RMSI PDCCH 335. If RMSI PDCCH 335 is decoded in a RMSI PDCCH monitor occasion 325, it will direct the UE to the scheduled RMSI PDSCH 340 for system information that may be used for initial access.

As discussed above, in order to improve decoding, some cell edge UEs (or UEs having relatively poor coverage) may combine RMSI PDCCH 335 across RMSI PDCCH monitor occasions 325 per SSB for decoding. After decoding the combined RMSI PDCCH, the UE may in some cases further combine scheduled RMSI PDSCH for decoding. In some cases, to facilitate RMSI combining across RMSI PDCCH monitor occasions 325 per SSB by the UE, a base station may configure a number of conditions, including providing a same aggregation level and payload for RMSI PDCCH 335 and same payload for RMSI PDSCH 340 across RMSI PDCCH monitoring window 320 (e.g., 8 windows per 160 ms RMSI TTI; where sequence frame numbers (SFNs) may be specified for start and end per RMSI TTI, such as mod(SFN,16)=0 and 15). In such cases, RMSI PDCCH 335 may appear once in every X windows (e.g., X=1). For multiplex pattern 1, RMSI PDCCH may appear in either RMSI PDCCH monitor occasions 325 per RMSI PDCCH monitoring window 320 or at least in a fixed RMSI PDCCH monitor occasion 325 that is predefined (e.g., in a first RMSI PDCCH monitor occasion 325 per RMSI PDCCH monitoring window 320). In some cases, RMSI PDCCH 335 locations within different RMSI PDCCH monitoring windows 320 may be in different monitoring occasions. In some cases, RMSI PDCCH 335 frequency locations may be different in different RMSI PDCCH monitor occasions 325, such as is discussed with reference to the example in FIG. 4.

Figure 4:
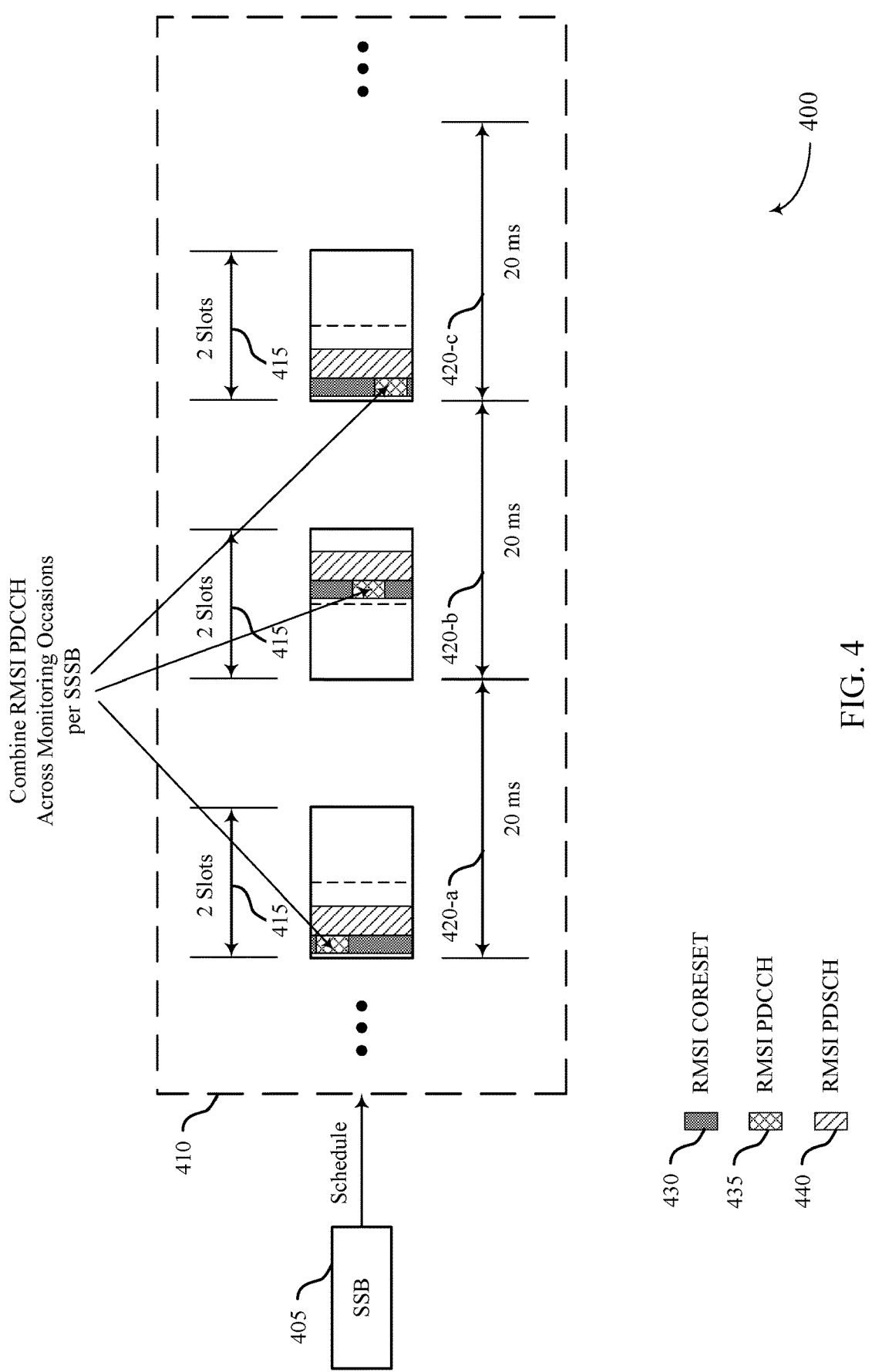
FIG. 4 illustrates an example of a RMSI combining pattern that supports resource identification techniques for combining multiple instances of system information in accordance with aspects of the present disclosure.

FIG. 4 illustrates an example of a RMSI combining pattern 400 that supports resource identification techniques for combining multiple instances of system information in accordance with aspects of the present disclosure. In some examples, RMSI combining pattern 400 may implement aspects of wireless communications system 100. In the example of FIG. 4, SSB 405 may have a schedule configuration 410 that provides a number of periodic RMSI PDCCH monitoring windows 420, similarly as discussed above with reference to FIG. 3.

In this example, a UE may combine multiple instances of RMSI PDCCH 435 transmitted in multiple RMSI PDCCH monitoring windows 420. As discussed above, in some cases one of a number of available multiplexing patterns may be established for SSB 405 that may define a number of occasions in which RMSI PDCCH 435 may appear. After decoding PBCH, a UE may look for potential RMSI PDCCH in the indicated monitor occasions. The RMSI monitor occasions may include RMSI CORESET 430 and RMSI PDCCH 435. If RMSI PDCCH 435 is decoded, it will direct the UE to the scheduled RMSI PDSCH 440 for system information that may be used for initial access. In the example of FIG. 4, to improve decoding rate at UEs with relatively poor channel quality, a UE can combine a same RMSI PDCCH 435 that is transmitted in first RMSI PDCCH monitoring window 420-*a*, second RMSI PDCCH monitoring window 420-*b*, and third RMSI PDCCH monitoring window 420-*c*. After decoding RMSI PDCCH 435, the UE can further combine scheduled RMSI PDSCH 440 for decoding.

As indicated above, in some cases RMSI PDCCH 435 time/frequency locations may be known or partially known to the UE in cases where RMSI combining is supported. In some cases, if RMSI PDCCH 435 appears in an occasion, its frequency location in the RMSI CORESET 430 may be known to the UE if the base station indicates support of RMSI PDCCH combining per SSB. In some cases, RMSI PDCCH 435 may have a fixed frequency location across monitoring occasions. For example, a fixed frequency location of RMSI PDCCH 435 may be predefined if it appears in a monitor occasion. In some examples, the fixed frequency location may be represented by a fixed aggregation level and PDCCH candidate index within this level, a fixed starting CCE index in all CCEs in the RMSI CORESET 430 and aggregation level, a fixed set of occupied REGs in the CORESET bandwidth, of combinations thereof.

In some cases, RMSI PDCCH 435 may hop in frequency across occasions with known hopping pattern. Such a hopping pattern may be predefined, and a frequency location of RMSI PDCCH 435, if it appears in a monitor occasion, may be determined based on one or more parameters associated with a monitor occasion. Such parameters may include, for example, one or more of: a SSB ID whose PBCH schedules RMSI PDCCH 435 monitor occasions; a cell ID of a serving cell, the monitor occasion's SFN, the monitor occasion's first slot index in the carrying frame; the monitor occasion's first symbol index in the carrying slot; a SCS of RMSI PDCCH 435; a SCS of the PBCH scheduling RMSI PDCCH 435; the multiplexing pattern index (e.g., predefined multiplex pattern 1, 2, or 3 that identifies a number of monitoring occasions within a RMSI PDCCH monitoring window 420), a bandwidth and number of symbols of the RMSI CORESET 430; a monitor occasion configuration index (i.e., a defined configuration index of 0 to 13 that identifies monitor occasion parameters), or any combinations thereof. In some cases, the RMSI PDCCH 435 frequency location can be represented by the candidate PDCCH index (or the possible frequency location index) within a given aggregation level or across all levels.

In other cases, a time location of the RMSI PDCCH 435 may be known or identifiable by the UE. In such cases, the monitoring occasions carrying RMSI PDCCH is known or partially known to the UE if the base station indicates support of RMSI PDCCH combining per SSB, such that the monitor occasions carrying RMSI PDCCH may be identified by the UE. In some examples, predefined monitor occasions may be provided where RMSI PDCCH will appear. For example, for multiplex pattern 1, such a time location definition may provide that the first monitor occasion per monitor window will carry RMSI PDCCH. In other examples, RMSI PDCCH may hop across the two monitor occasions per window with a known pattern. In other cases, monitor occasions carrying RMSI PDCCH may be partially known to the UE. In such cases, the UE may know that RMSI PDCCH will appear once in every X occasions/windows (e.g., for multiplex pattern 1, the RMSI PDCCH will appear once in the two occasions for every monitor window), and the UE may blind decode each identified monitor occasion to identify occasions really carrying RMSI PDCCH.

In further cases, a UE may be configured with combinations of known frequency and time location patterns. In such cases, options for RMSI PDCCH frequency and time locations with known or partially known patterns, such as discussed above, can be used in any combination. For example, a base station and UE may be configured such that RMSI control information has a known frequency location within each monitoring occasion and a partially known time location within monitoring occasions. In such cases, a UE may monitor one or more time locations at identified fixed frequency locations.

Figure 5:
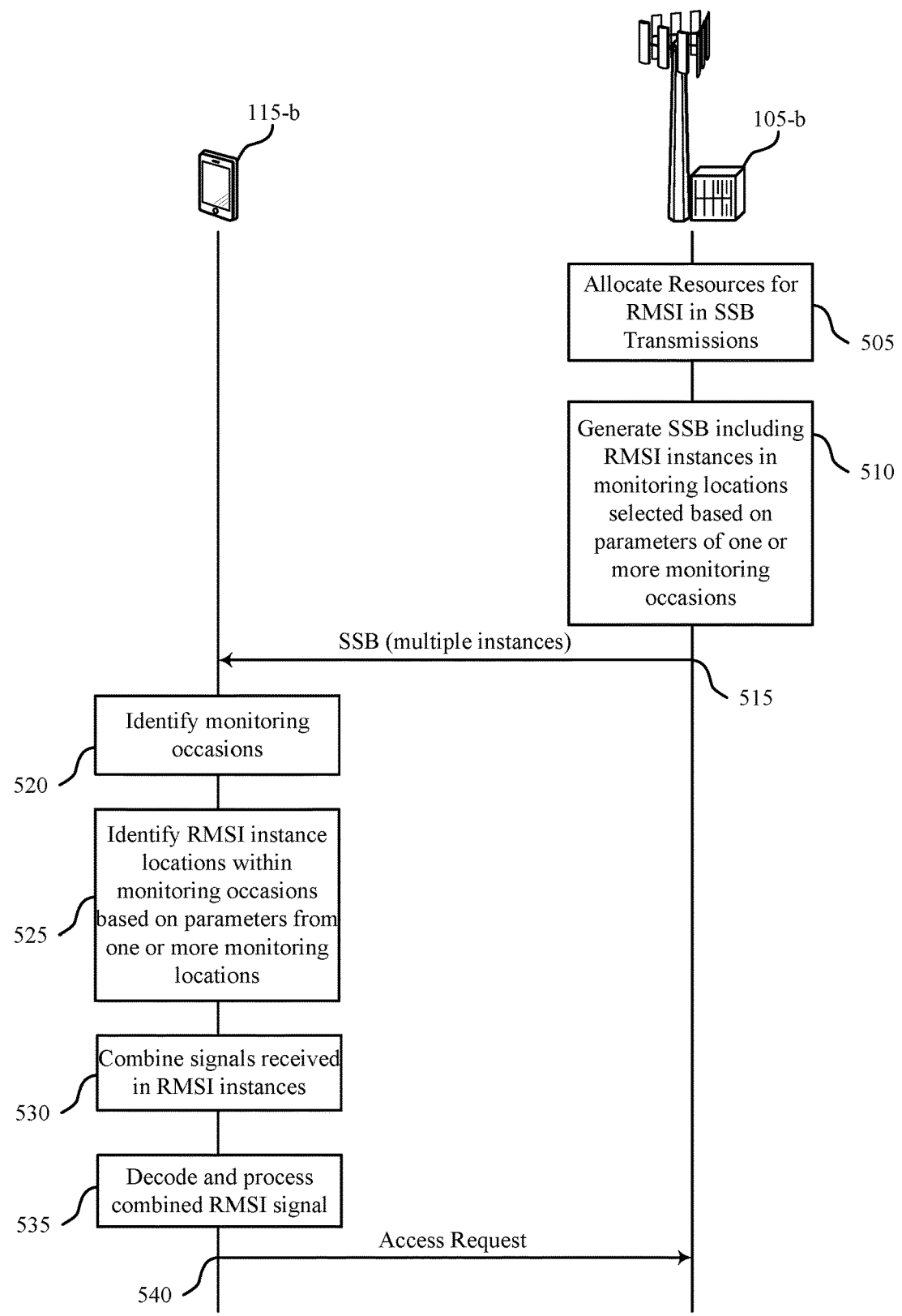
FIG. 5 illustrates an example of a process flow that supports resource identification techniques for combining multiple instances of system information in accordance with aspects of the present disclosure.

FIG. 5 illustrates an example of a process flow 500 that supports resource identification techniques for combining multiple instances of system information in accordance with aspects of the present disclosure. In some examples, process flow 500 may implement aspects of wireless communications system 100. In this example, process flow 500 includes UE **115-*b* and base station 105-*b*, which may be examples of the corresponding devices described with reference to FIGS. 1 and 2**.

At 505, the base station **105-*b*** may allocate resources for RMSI in SSB transmissions. In some cases, the resources may include resources for multiple instances of RMSI transmissions that are allocated within a particular SSB (e.g., in a SSB that may be transmitted in multiple monitoring windows within a SSB transmission time interval (TTI)). In some cases, the resources may include resources for multiple instances of RMSI transmissions that are transmitted in different SSBs. In some cases, the RMSI transmissions may include multiple instances of the same RMSI to be transmitted within a SSB and across different SSBs.

At 510, the base station **105-*b* may generate one or more SSBs including multiple RMSI instances and a combining indication. In some cases, the one or more RMSI instances may include a same aggregation level and payload. In some cases, multiple instances of a RMSI PDSCH may be transmitted, which have a same payload and may be combined at the UE 115-*b*. In some cases, the RMSI instances may be transmitted in resource locations selected based on parameters of one or more monitoring occasions, such as discussed above with respect to FIGS. 2 through 4**. For example, RMSI PDCCH instances, RMSI PDSCH instances, or both, may be transmitted across a RMSI PDCCH monitoring window (e.g., 5 windows per 160 ms RMSI TTI; where sequence frame numbers (SFNs) may be specified for start and end per RMSI TTI, such as mod(SFN,16)=0 and 15). In such cases, RMSI PDCCH may appear once in every X windows (e.g., X=1). For multiplex pattern 1, RMSI PDCCH may appear in either monitor occasion per window or at least in a fixed monitor occasion that is predefined (e.g., in a first monitor occasion per window according to a predefined time location). In some cases, RMSI PDCCH frequency locations may be different in different monitor occasions, and the UE may identify a frequency location or frequency hopping pattern to determine the frequency locations. Such a frequency hopping pattern may be predefined in some cases (e.g., as a function of window index, SSB index, cell ID, SFN, a monitoring occasion first slot/symbol index in the frame/slot, RMSI sub-carrier spacing (SCS), or any combination thereof).

At 515, the base station **105-*b* may transmit the SSB transmissions, including multiple instances of RMSI, as discussed above. The SSB may also include the indication that the multiple RMSI instances may be combined at the UE 115-*b*** (e.g., an indication provided via one or more bits in the RMSI PDCCH or that may be derived based on one or more signals within the RMSI PDCCH).

At 520, the UE **115-*b*** may identify monitoring occasions that are candidates for RMSI transmissions. In some cases, the monitoring occasions may be within different instances of an SSB or across multiple SSBs. In some cases, the resources for RMSI instances may be identified based on a multiplexing pattern that is used for SSB transmissions.

At 525, the UE **115-*b* may identify RMSI instance locations within monitoring occasions based on parameters from one or more monitoring locations. In some cases, the RMSI instances may be transmitted in resource locations selected based on parameters of one or more monitoring occasions, such as discussed above with respect to FIGS. 2 through 4**. For example, RMSI PDCCH instances, RMSI PDSCH instances, or both, may be transmitted across a RMSI PDCCH monitoring window (e.g., 5 windows per 160 ms RMSI TTI; where sequence frame numbers (SFNs) may be specified for start and end per RMSI TTI, such as mod(SFN, 16)=0 and 15). In such cases, RMSI PDCCH may appear once in every X windows (e.g., X=1). For multiplex pattern 1, RMSI PDCCH may appear in either monitor occasion per window or at least in a fixed monitor occasion that is predefined (e.g., in a first monitor occasion per window according to a predefined time location). In some cases, RMSI PDCCH frequency locations may be different in different monitor occasions, and the UE may identify a frequency location or a frequency hopping pattern to determine the frequency locations. Such a frequency hopping pattern may be predefined in some cases (e.g., as a function of window index, SSB index, cell ID, SFN, a monitoring occasion first slot/symbol index in the frame/slot, RMSI sub-carrier spacing (SCS), or any combination thereof).

At 530, the UE 115-b may combine signals received in multiple of the identified RMSI instances. In some cases, the UE 115-b may store received signals of a first RMSI instance in a soft combining buffer, and add corresponding received signals from a second RMSI instance to the soft combining buffer. In cases where more than two instances of RMSI are combined, such additional instances may be added to the soft-combining buffer upon receipt.

At 535, the UE 115-b may attempt to decode the combined RMSI signals. In some cases, a decoder may attempt to decode the RMSI and provide the bits corresponding to the RMSI output to a processor that may identify one or more fields within the RMSI. For example, the UE 115-b may determine RMSI PDSCH resources which may be indicated in decoded RMSI PDCCH information. The RMSI PDSCH resources may include, for example, one or more parameters that may be used by the UE 115-b to access the wireless communication system through the base station 105-b. In some cases, the UE 115-b may combine multiple instances of RMSI PDSCH resources and decode the combined RMSI PDSCH resources. In some cases, the UE 115-b may decode system information for system access from the RMSI PDSCH. In some cases, the system information may include parameters to be used for initial system access by the UE 115-b.

At 540, the UE 115-b may transmit an access request to the base station 105-b. In some cases, the access request may be transmitted using parameters that are determined based on the RMSI that is decoded from multiple combined instances of the RMSI. In some cases, the access request may be a random access channel (RACH) message 1 transmission for a random access request to the base station 105-b. In some cases, one or more of a preamble of the message 1 transmission, resources for the message 1 transmission, or combinations thereof, may be transmitted as part of the access request to the base station 105-b.

Figure 6:
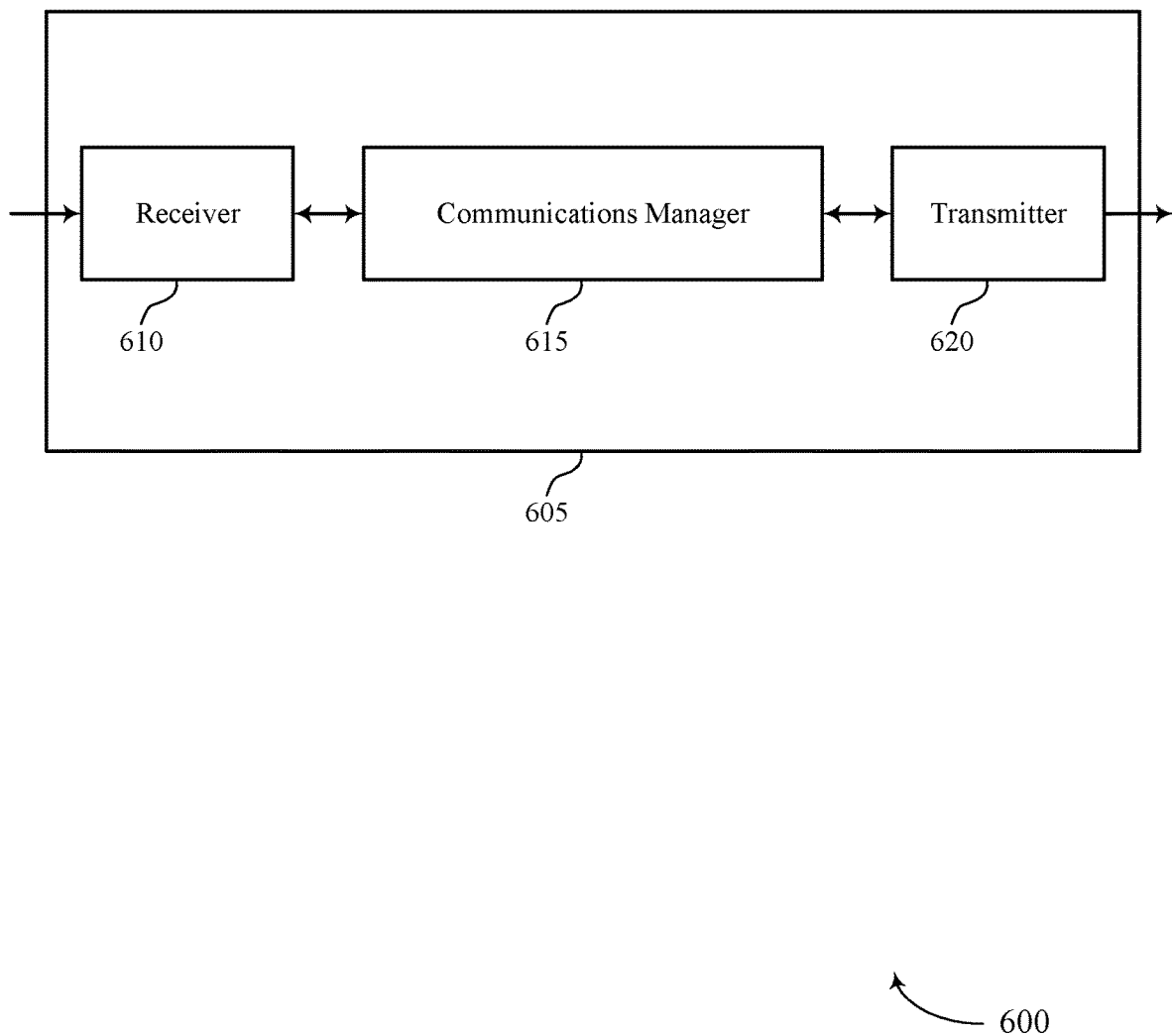
FIGS. 6 and 7 show block diagrams of devices that support resource identification techniques for combining multiple instances of system information in accordance with aspects of the present disclosure.

FIG. 6 shows a block diagram 600 of a device 605 that supports resource identification techniques for combining multiple instances of system information in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to resource identification techniques for combining multiple instances of system information, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a set of monitoring occasions available for transmission of RMSI scheduling information from a base station, determine, based on one or more parameters associated with at least a first monitoring occasion, two or more time locations, frequency locations, or combinations thereof, that are to be monitored for RMSI scheduling information, combine signals received in the two or more locations to generate a combined RMSI signal, and attempt to decode the combined signals to obtain the RMSI scheduling information. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
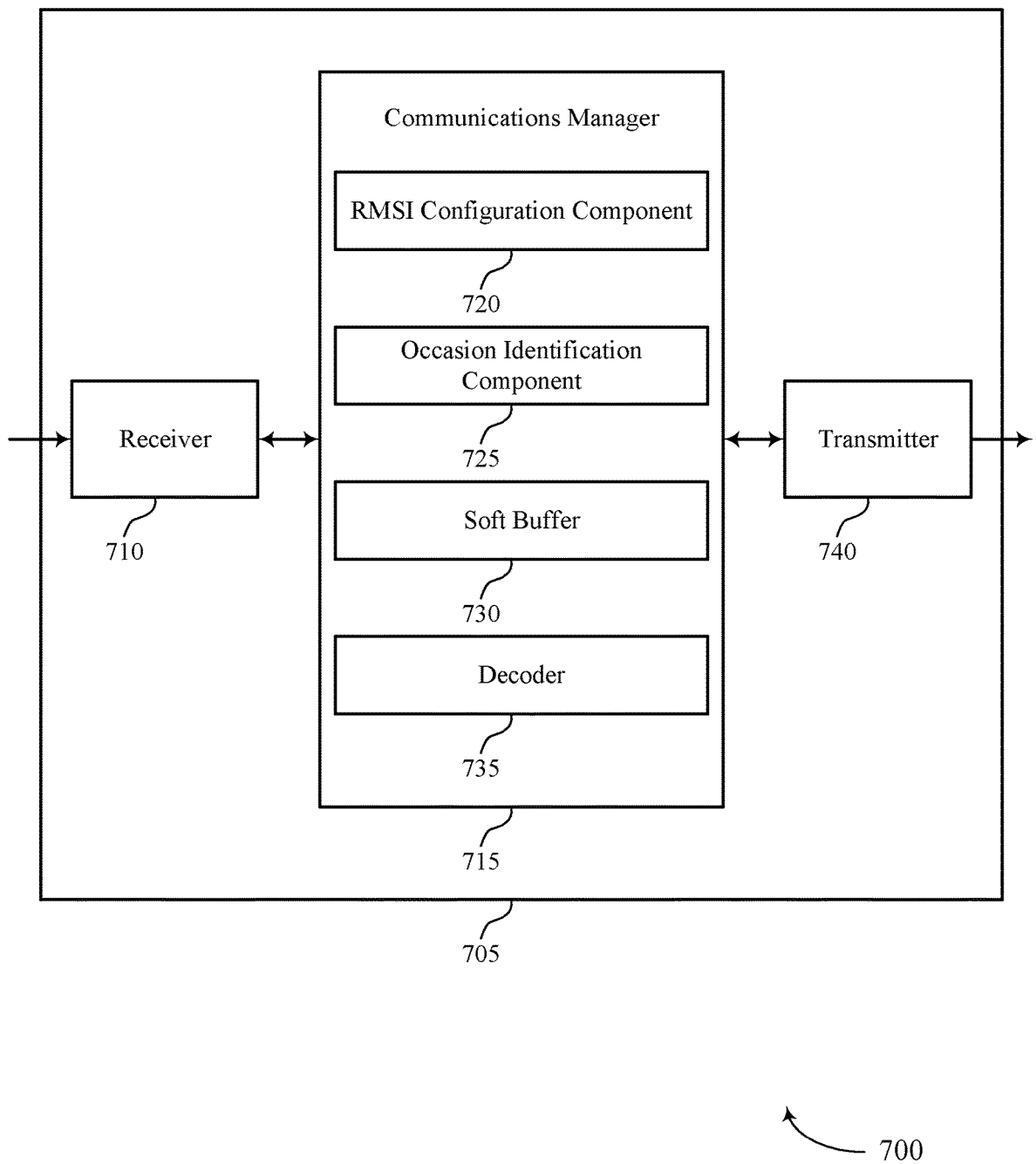

FIG. 7 shows a block diagram 700 of a device 705 that supports resource identification techniques for combining multiple instances of system information in accordance with aspects of the present disclosure. The device 705 may be an example of aspects of a device 605 or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to resource identification techniques for combining multiple instances of system information, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a RMSI configuration component 720, an occasion identification component 725, a soft buffer 730, and a decoder 735. The communications manager 715 may be an example of aspects of the communications manager 910 described herein.

The RMSI configuration component 720 may identify a set of monitoring occasions available for transmission of RMSI scheduling information from a base station. For example, RMSI PDCCH instances, RMSI PDSCH instances, or both, may be transmitted across a RMSI PDCCH monitoring window (e.g., 5 windows per 160 ms RMSI TTI; where sequence frame numbers (SFNs) may be specified for start and end per RMSI TTI, such as mod(SFN, 16)=0 and 15). In such cases, RMSI PDCCH may appear once in every X windows (e.g., X=1). For multiplex pattern 1, RMSI PDCCH may appear in either monitor occasion per window or at least in a fixed monitor occasion that is predefined (e.g., in a first monitor occasion per window according to a predefined time location).

The occasion identification component 725 may determine, based on one or more parameters associated with at least a first monitoring occasion, two or more time locations, frequency locations, or combinations thereof, that are to be monitored for RMSI scheduling information.

The soft buffer 730 may combine signals received in the two or more locations to generate a combined RMSI signal. In some cases, the UE may monitor for signals in a first time/frequency location and store the monitored signals in the soft buffer, and combine signals from a second location by adding the signals from the second location. In some cases, two instances of RMSI signals may be combined, although in other cases three or more instances may be combined.

The decoder 735 may attempt to decode the combined signals to obtain the RMSI scheduling information. The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
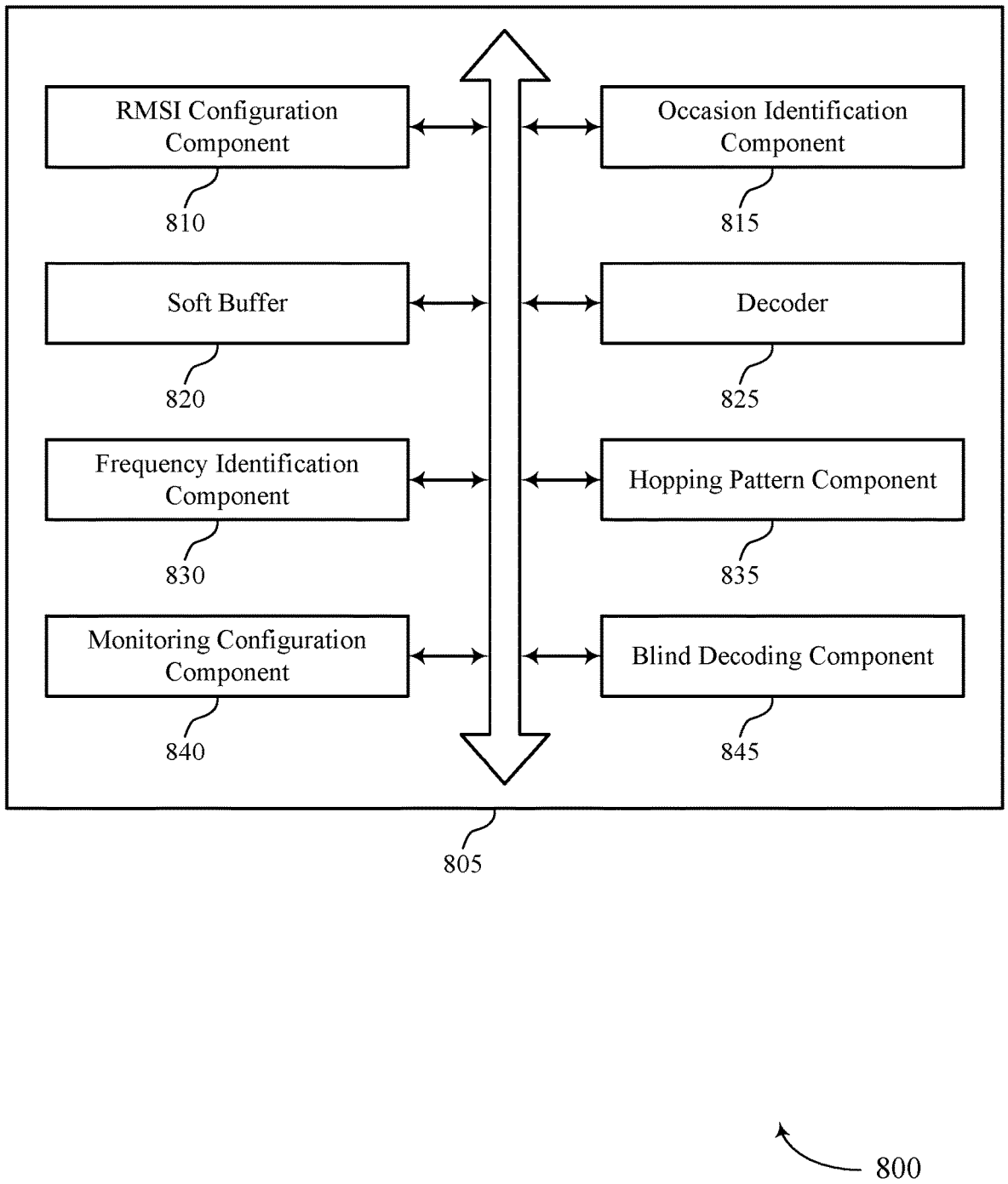
FIG. 8 shows a block diagram of a device that supports resource identification techniques for combining multiple instances of system information in accordance with aspects of the present disclosure.

FIG. 8 shows a block diagram 800 of a communications manager 805 that supports resource identification techniques for combining multiple instances of system information in accordance with aspects of the present disclosure. The communications manager 805 may be an example of aspects of a communications manager 615, a communications manager 715, or a communications manager 910 described herein. The communications manager 805 may include a RMSI configuration component 810, an occasion identification component 815, a soft buffer 820, a decoder 825, a frequency identification component 830, a hopping pattern component 835, a monitoring configuration component 840, and a blind decoding component 845. Each of these modules may communicate, directly or indirectly, with one another (e.g., via one or more buses).

The RMSI configuration component 810 may identify a set of monitoring occasions available for transmission of RMSI scheduling information from a base station. For example, RMSI PDCCH instances, RMSI PDSCH instances, or both, may be transmitted across a RMSI PDCCH monitoring window (e.g., 5 windows per 160 ms RMSI TTI; where sequence frame numbers (SFNs) may be specified for start and end per RMSI TTI, such as mod(SFN, 16)=0 and 15). In such cases, RMSI PDCCH may appear once in every X windows (e.g., X=1). For multiplex pattern 1, RMSI PDCCH may appear in either monitor occasion per window or at least in a fixed monitor occasion that is predefined (e.g., in a first monitor occasion per window according to a predefined time location).

The occasion identification component 815 may determine, based on one or more parameters associated with at least a first monitoring occasion, two or more time locations, frequency locations, or combinations thereof, that are to be monitored for RMSI scheduling information. In some cases, the one or more parameters include, for each of the set of monitoring occasions, one or more of an identification parameter associated with the base station or monitoring occasion; an index value associated with the monitoring occasion; a frequency parameter associated with the monitoring occasion; a RMSI multiplexing pattern; or any combinations thereof. In some cases, the RMSI scheduling information has a fixed frequency location within each monitoring occasion and a partially known time location within each monitoring occasion or across monitoring occasions, has a fixed time location within each monitoring occasion or across monitoring occasions and a partially known frequency location within each monitoring occasion, or combinations thereof.

The soft buffer 820 may combine signals received in the two or more locations to generate a combined RMSI signal. In some cases, the UE may monitor for signals in a first time/frequency location and store the monitored signals in the soft buffer, and combine signals from a second location by adding the signals from the second location. In some cases, two instances of RMSI signals may be combined, although in other cases three or more instances may be combined. The decoder 825 may attempt to decode the combined signals to obtain the RMSI scheduling information.

The frequency identification component 830 may identify a fixed frequency location of the RMSI relative to a frequency bandwidth used for control channel transmissions within each monitoring occasion. In some examples, the frequency identification component 830 may determine that the first monitoring occasion and one or more other monitoring occasions are to be monitored for the RMSI scheduling information. In some cases, the fixed frequency location of the RMSI is determined based on an aggregation level for RMSI scheduling information transmissions, an index value of a control channel used to transmit the RMSI scheduling information, or combinations thereof. In some cases, the fixed frequency location of the RMSI is determined based on a starting control channel element (CCE) index of a control channel transmission containing the RMSI scheduling information. In some cases, the fixed frequency location of the RMSI is determined based on a set of occupied resource element groups (REGs) of a control resource set containing the RMSI scheduling information.

The hopping pattern component 835 may identify a frequency hopping pattern of the RMSI relative to a frequency bandwidth used for control channel transmissions within each monitoring occasion. In some examples, the hopping pattern component 835 may determine that the first monitoring occasion and one or more other monitoring occasions are to be monitored for the RMSI scheduling information based on the frequency hopping pattern. In some examples, the control channel carrying RMSI scheduling information across the monitoring occasions is determined, for each monitoring occasion, based at least in part on: a synchronization signal block (SSB) identification of control information used to schedule the monitoring occasions; a cell identification associated with the base station; a sequence frame number (SFN) of the monitoring occasion; a first slot index of a carrying frame of the monitoring occasion; a first symbol index of a carrying slot of the monitoring occasion; a sub-carrier spacing (SCS) of a downlink control channel carrying the RMSI; a SCS of broadcast channel that schedules the monitoring occasions; a SSB and RMSI multiplexing pattern; a frequency bandwidth and number of symbols of a control resource set used for the downlink control channel; an index value of the monitoring occasion configuration; or any combinations thereof.

The monitoring configuration component 840 may identify one or more fixed monitoring occasions for transmission of two or more instances of the RMSI scheduling information. In some examples, the monitoring configuration component 840 may determine a frequency location within each monitoring occasion to be monitored for the RMSI scheduling information. In some cases, the one or more fixed monitoring occasions are identified based on a configured multiplexing pattern of monitoring occasions. In some cases, the one or more fixed monitoring occasions are identified based on a predetermined pattern of monitoring occasions within a time window.

The blind decoding component 845 may identify one or more candidate monitoring occasions for transmission of two or more instances of the RMSI scheduling information. In some examples, the blind decoding component 845 may blind decode each of the one or more candidate monitoring occasions to determine a presence of RMSI. In some cases, the one or more candidate monitoring occasions are a subset of the set of monitoring occasions based on a number of occasions RMSI is transmitted during a time window.

Figure 9:
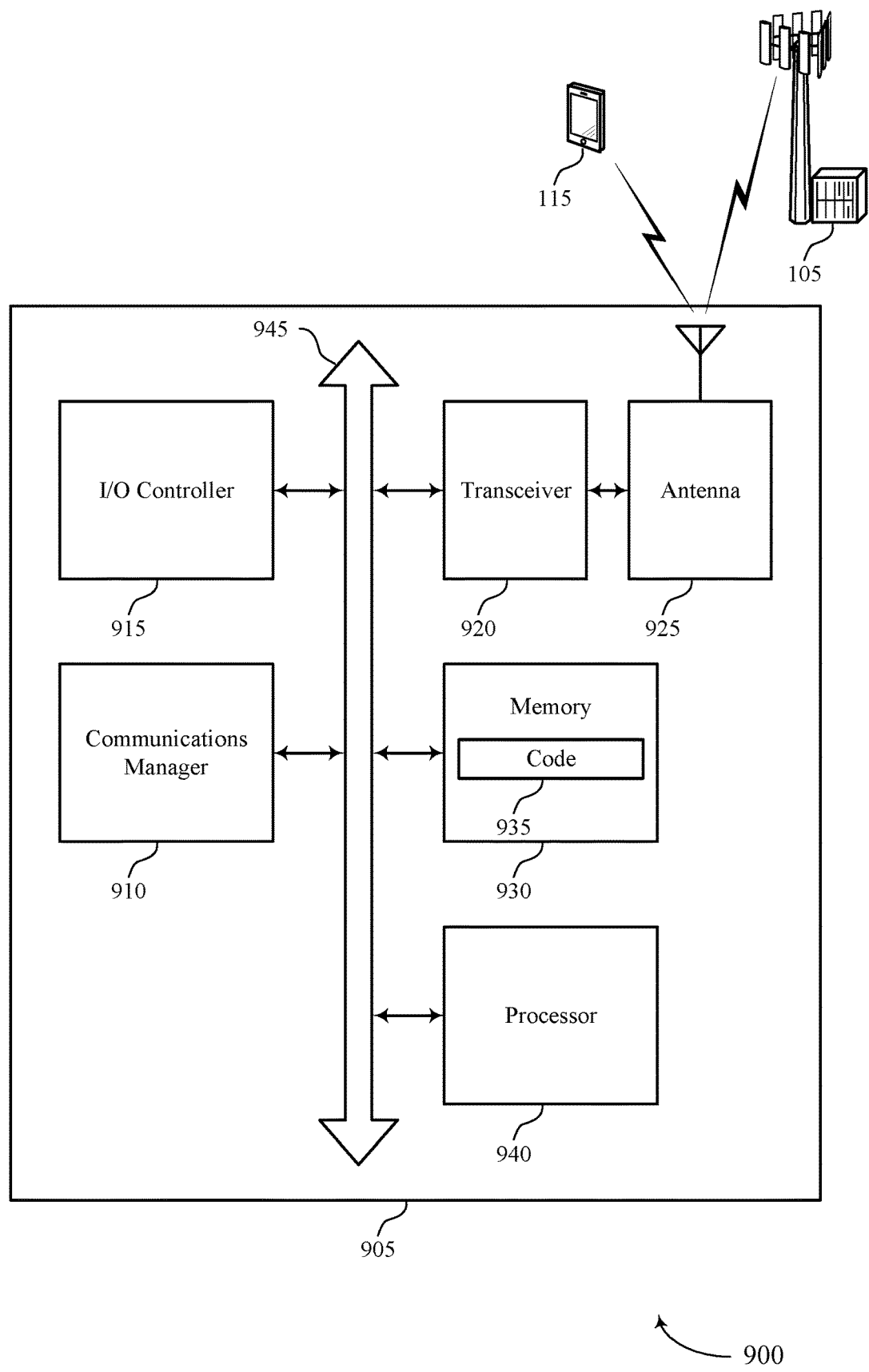
FIG. 9 shows a diagram of a system including a device that supports resource identification techniques for combining multiple instances of system information in accordance with aspects of the present disclosure.

FIG. 9 shows a diagram of a system 900 including a device 905 that supports resource identification techniques for combining multiple instances of system information in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a set of monitoring occasions available for transmission of remaining minimum system information (RMSI) scheduling information from a base station, determine, based on one or more parameters associated with at least a first monitoring occasion, two or more time locations, frequency locations, or combinations thereof, that are to be monitored for RMSI scheduling information, combine signals received in the two or more locations to generate a combined RMSI signal, and attempt to decode the combined signals to obtain the RMSI scheduling information.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting resource identification techniques for combining multiple instances of system information).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
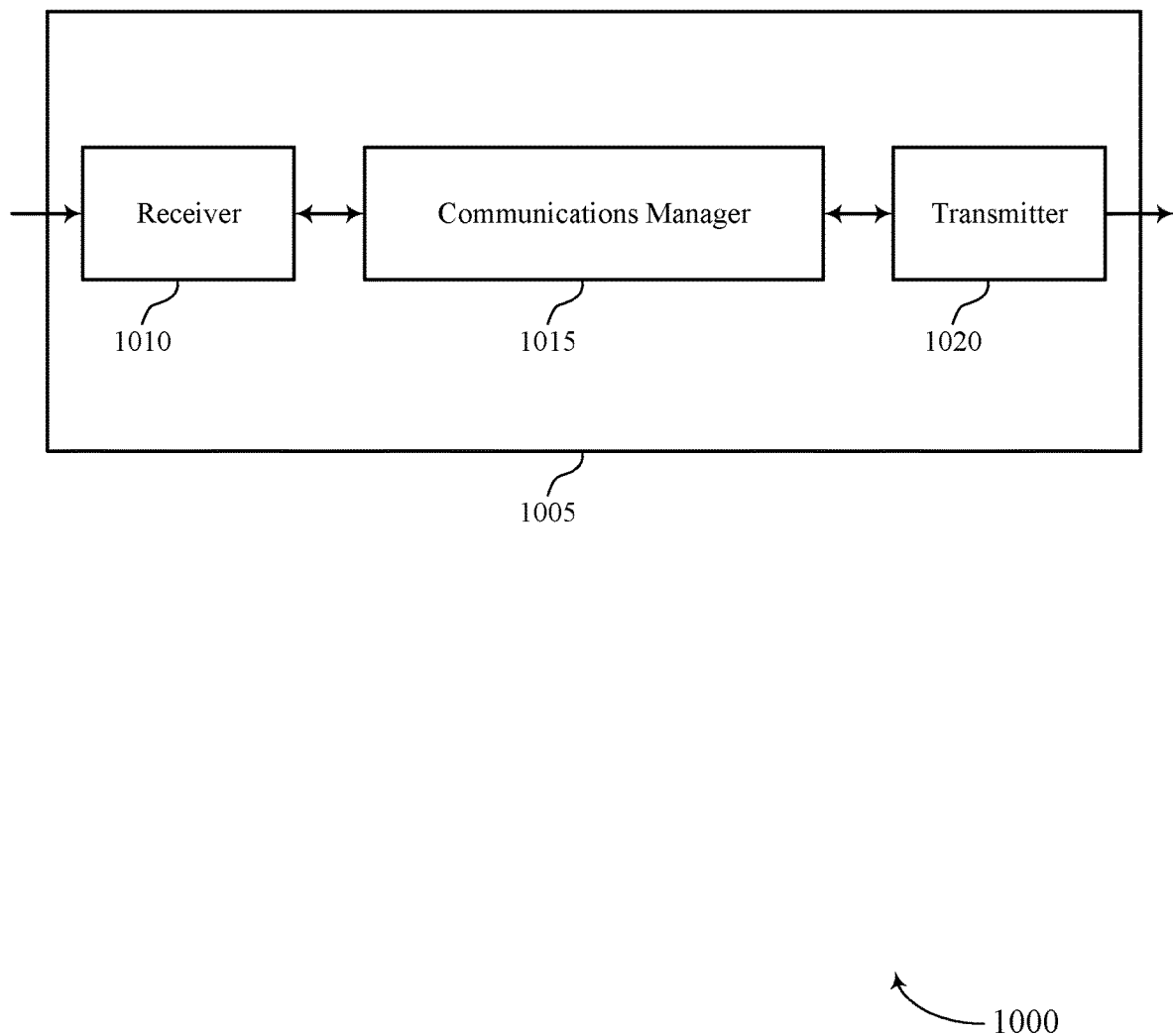
FIGS. 10 and 11 show block diagrams of devices that support resource identification techniques for combining multiple instances of system information in accordance with aspects of the present disclosure.

FIG. 10 shows a block diagram 1000 of a device 1005 that supports resource identification techniques for combining multiple instances of system information in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to resource identification techniques for combining multiple instances of system information, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a set of occasions available for transmission of RMSI scheduling information to a UE, determine, based on one or more parameters associated with at least a first occasion of the set of occasions, two or more time locations, frequency locations, or combinations thereof, for transmission of RMSI scheduling information, and transmit two or more instances of the RMSI scheduling information via the two or more locations. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
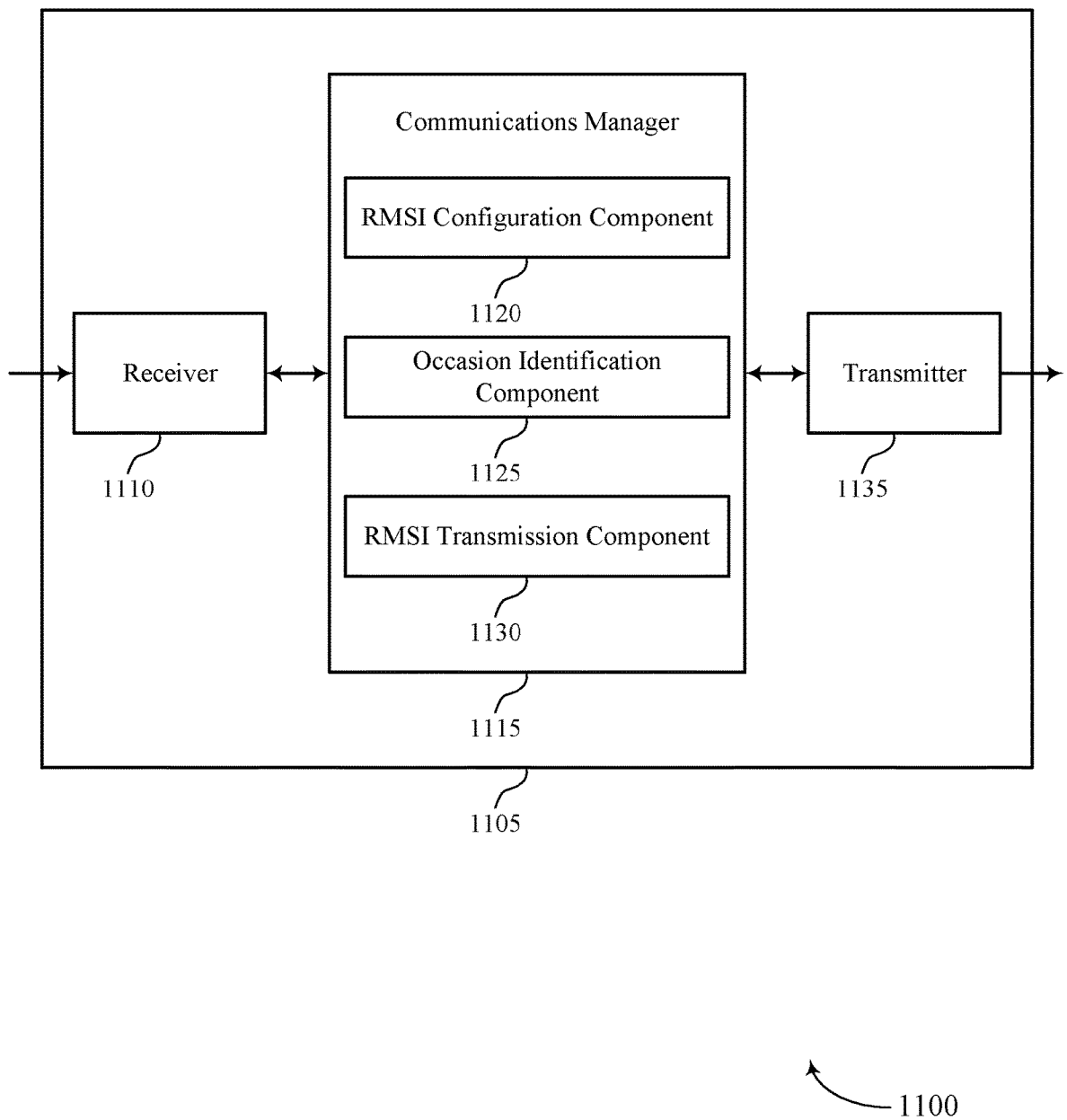

FIG. 11 shows a block diagram 1100 of a device 1105 that supports resource identification techniques for combining multiple instances of system information in accordance with aspects of the present disclosure. The device 1105 may be an example of aspects of a device 1005 or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to resource identification techniques for combining multiple instances of system information, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a RMSI configuration component 1120, an occasion identification component 1125, and a RMSI transmission component 1130. The communications manager 1115 may be an example of aspects of the communications manager 1310 described herein.

The RMSI configuration component 1120 may identify a set of occasions available for transmission of remaining minimum system information (RMSI) scheduling information to a UE.

The occasion identification component 1125 may determine, based on one or more parameters associated with at least a first occasion of the set of occasions, two or more time locations, frequency locations, or combinations thereof, for transmission of RMSI scheduling information.

The RMSI transmission component 1130 may transmit two or more instances of the RMSI scheduling information via the two or more locations.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
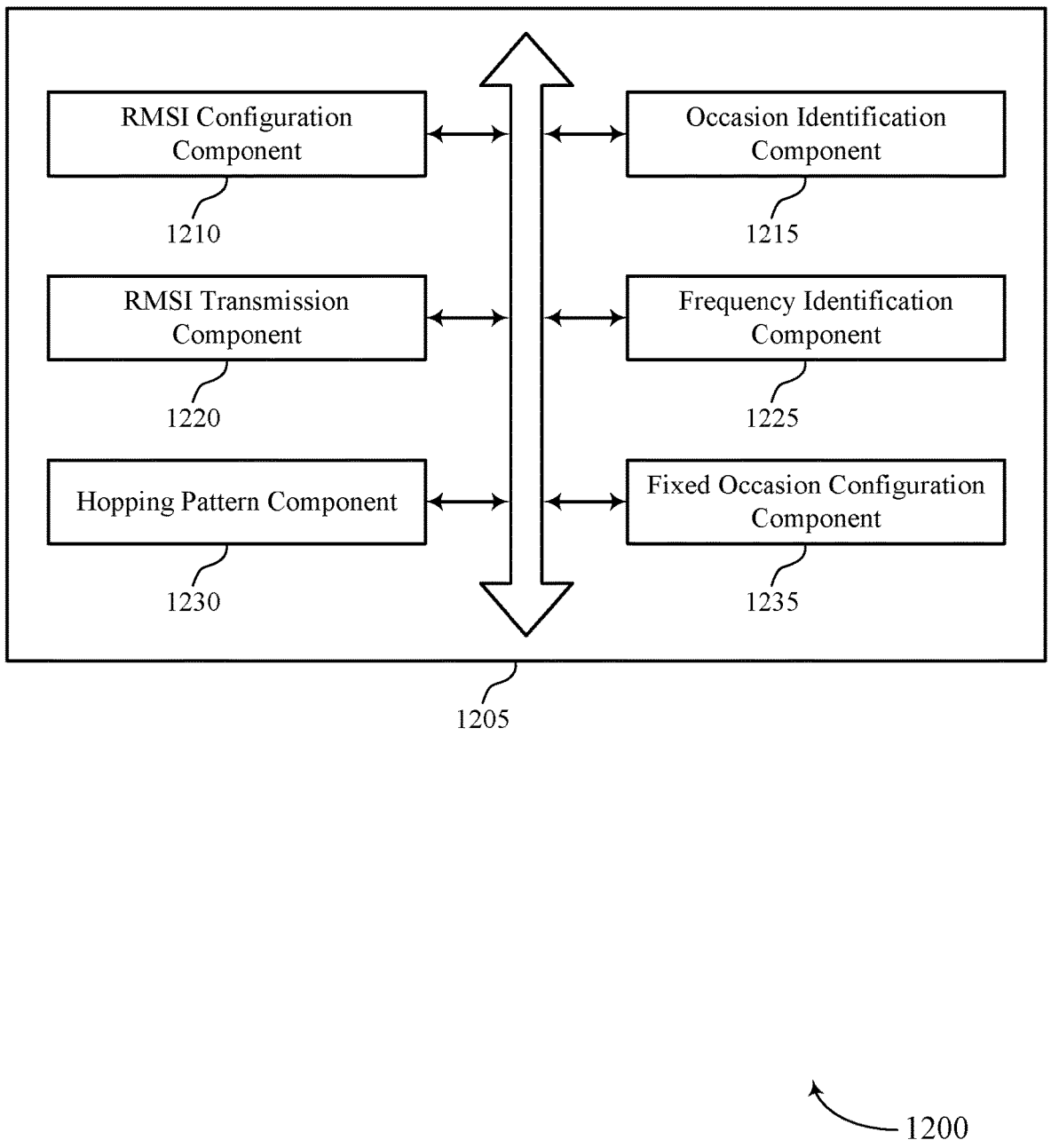
FIG. 12 shows a block diagram of a device that supports resource identification techniques for combining multiple instances of system information in accordance with aspects of the present disclosure.

FIG. 12 shows a block diagram 1200 of a communications manager 1205 that supports resource identification techniques for combining multiple instances of system information in accordance with aspects of the present disclosure. The communications manager 1205 may be an example of aspects of a communications manager 1015, a communications manager 1115, or a communications manager 1310 described herein. The communications manager 1205 may include a RMSI configuration component 1210, an occasion identification component 1215, a RMSI transmission component 1220, a frequency identification component 1225, a hopping pattern component 1230, and a fixed occasion configuration component 1235. Each of these modules may communicate, directly or indirectly, with one another (e.g., via one or more buses).

The RMSI configuration component 1210 may identify a set of occasions available for transmission of remaining minimum system information (RMSI) scheduling information to a UE. For example, RMSI PDCCH instances, RMSI PDSCH instances, or both, may be transmitted across a RMSI PDCCH monitoring window (e.g., 5 windows per 160 ms RMSI TTI; where sequence frame numbers (SFNs) may be specified for start and end per RMSI TTI, such as mod(SFN,16)=0 and 15). In such cases, RMSI PDCCH may appear once in every X windows (e.g., X=1). For multiplex pattern 1, RMSI PDCCH may appear in either monitor occasion per window or at least in a fixed monitor occasion that is predefined (e.g., in a first monitor occasion per window according to a predefined time location).

The occasion identification component 1215 may determine, based on one or more parameters associated with at least a first occasion of the set of occasions, two or more time locations, frequency locations, or combinations thereof, for transmission of RMSI scheduling information. In some examples, the occasion identification component 1215 may identify a set of candidate occasions for transmission of two or more instances of the RMSI scheduling information. In some examples, the occasion identification component 1215 may select a subset of the set of candidate occasions for transmission of the RMSI scheduling information. In some cases, the one or more parameters include, for each of the set of occasions, one or more of an identification parameter associated with a base station or occasion; an index value associated with the occasion; a frequency parameter associated with the occasion; a RMSI multiplexing pattern; or any combinations thereof. In some cases, the subset of the set of candidate occasions is randomly selected based on a number of occasions in which the RMSI scheduling information is to be transmitted during a time window. In some cases, the RMSI scheduling information has a fixed frequency location within each occasion and a partially known time location within each occasion or across occasions, has a fixed time location within each occasion or across occasions and a partially known frequency location within each occasion, or combinations thereof.

The RMSI transmission component 1220 may transmit two or more instances of the RMSI scheduling information via the two or more locations. In some cases, the two or more instances of the RMSI scheduling information may have a same aggregation level and payload for RMSI PDCCH and same payload for RMSI PDSCH, to facilitate combining of the multiple instances.

The frequency identification component 1225 may identify a fixed frequency location of the RMSI relative to a frequency bandwidth used for control channel transmissions within each of the set of occasions. In some examples, the frequency identification component 1225 may determine RMSI scheduling information is to be transmitted in the first occasion and one or more other occasions. In some cases, the fixed frequency location of the RMSI is determined based on an aggregation level for RMSI scheduling information transmissions, an index value of a control channel used to transmit the RMSI scheduling information, or combinations thereof. In some cases, the fixed frequency location of the RMSI is determined based on a starting control channel element (CCE) index of a control channel transmission containing the RMSI scheduling information. In some cases, the fixed frequency location of the RMSI is determined based on a set of occupied resource element groups (REGs) of a control resource set containing the RMSI scheduling information.

The hopping pattern component 1230 may identify a frequency hopping pattern of the RMSI relative to a frequency bandwidth used for control channel transmissions within each occasions. In some examples, the hopping pattern component 1230 may determine that the RMSI scheduling information is to be transmitted in the first occasion and one or more other occasions based on the frequency hopping pattern. In some examples, the hopping pattern component 1230 may determine the hopping pattern based at least in part on a synchronization signal block (SSB) identification of control information used to schedule the occasions, a cell identification associated with a base station, a sequence frame number (SFN) of the occasion, a first slot index of a carrying frame of the occasion, a first symbol index of a carrying slot of the occasion, a sub-carrier spacing (SC S) of a downlink control channel carrying the RMSI, a SCS of broadcast channel that schedules the occasions, a RMSI multiplexing pattern, a frequency bandwidth and number of symbols of the downlink control channel, an index value of the occasion, a control channel index associated with each occasion, or any combinations thereof.

The fixed occasion configuration component 1235 may identify one or more fixed occasions for transmission of two or more instances of the RMSI scheduling information. In some examples, the fixed occasion configuration component 1235 may determine a frequency location within each occasion for transmission of the RMSI scheduling information. In some cases, the one or more fixed occasions are identified based on a configured multiplexing pattern of occasions. In some cases, the one or more fixed occasions are identified based on a predetermined pattern of occasions within a time window.

Figure 13:
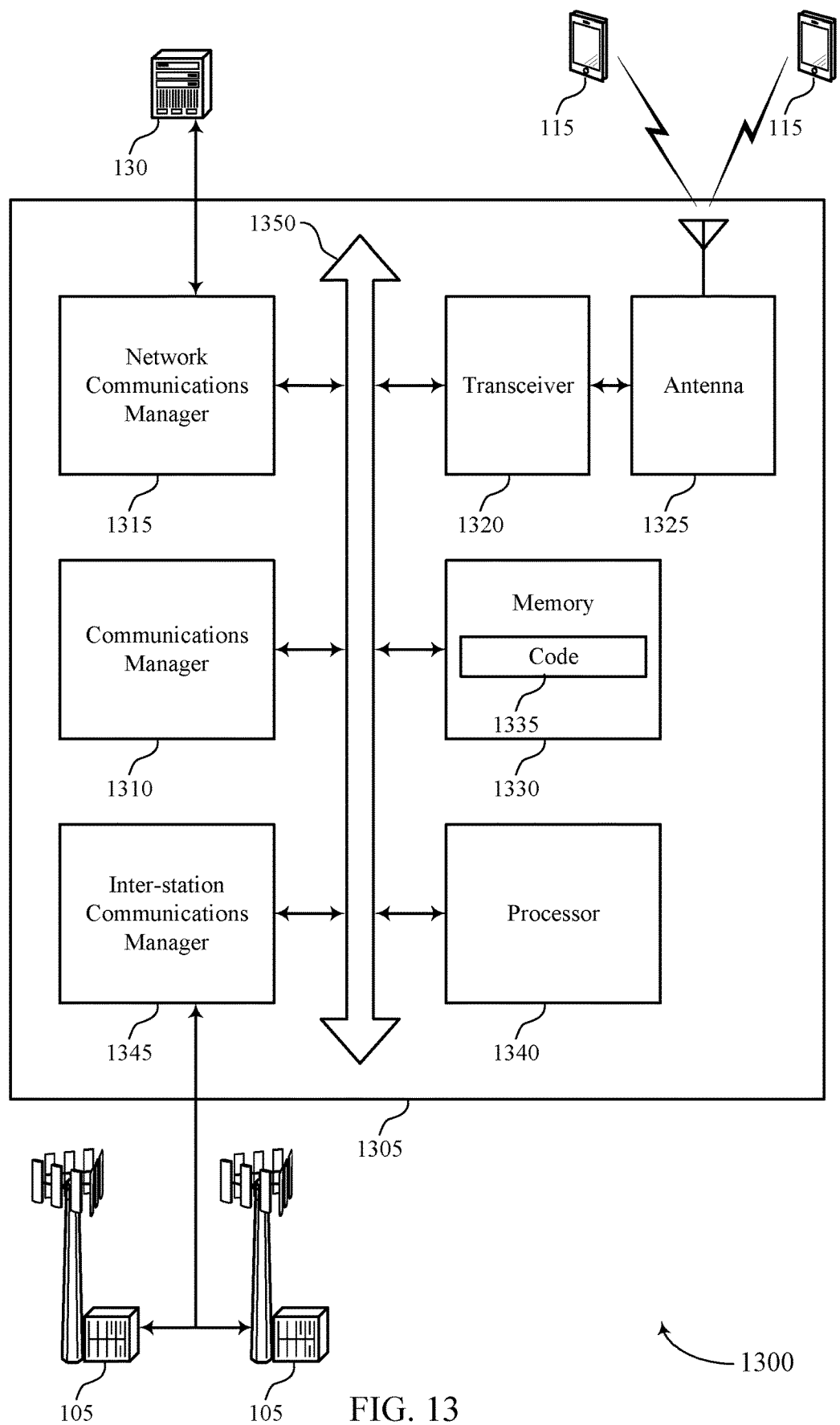
FIG. 13 shows a diagram of a system including a device that supports resource identification techniques for combining multiple instances of system information in accordance with aspects of the present disclosure.

FIG. 13 shows a diagram of a system 1300 including a device 1305 that supports resource identification techniques for combining multiple instances of system information in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a set of occasions available for transmission of RMSI scheduling information to a UE, determine, based on one or more parameters associated with at least a first occasion of the set of occasions, two or more time locations, frequency locations, or combinations thereof, for transmission of RMSI scheduling information, and transmit two or more instances of the RMSI scheduling information via the two or more locations.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device #{device} to perform various functions (e.g., functions or tasks supporting resource identification techniques for combining multiple instances of system information).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
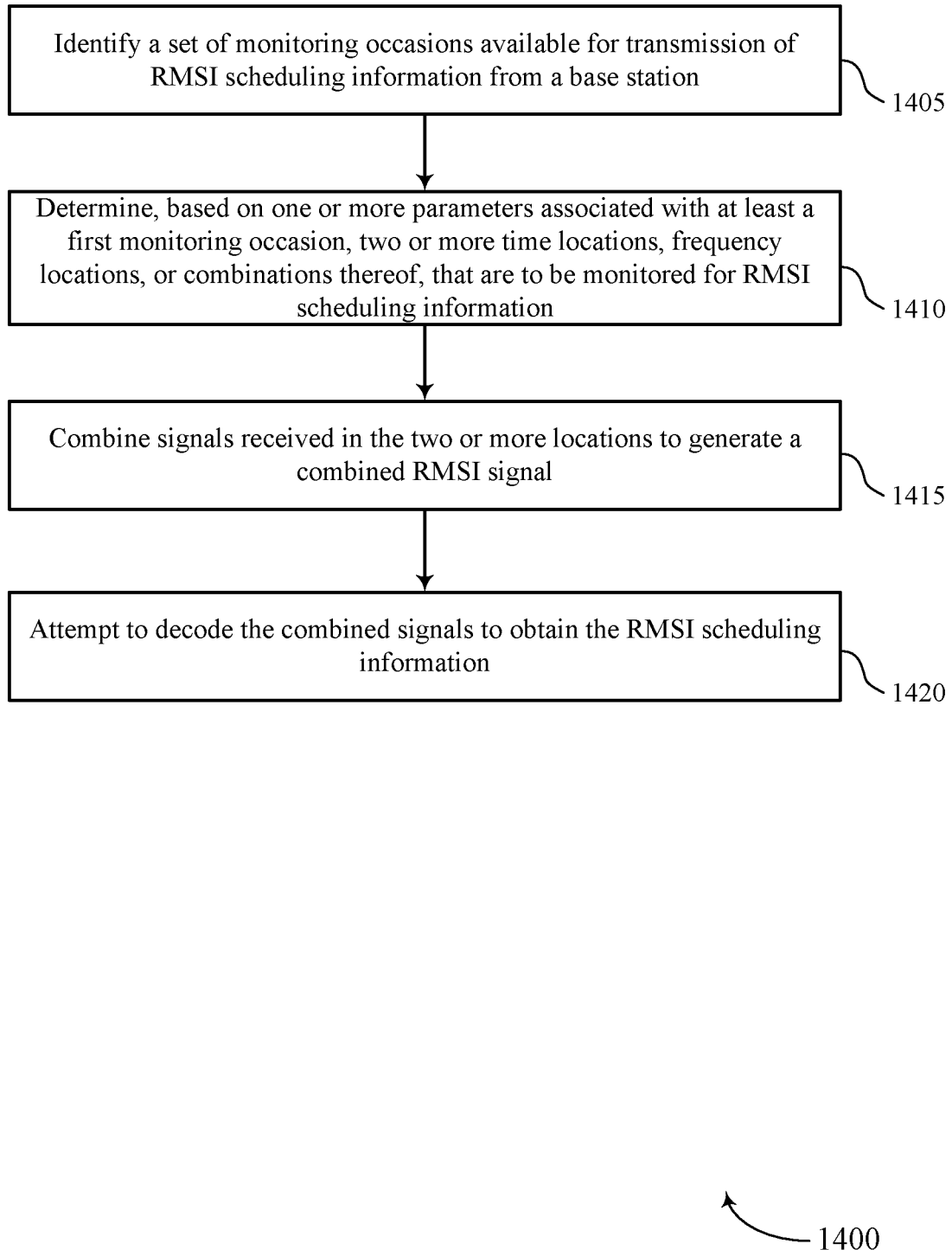
FIGS. 14 through 22 show flowcharts illustrating methods that support resource identification techniques for combining multiple instances of system information in accordance with aspects of the present disclosure.

FIG. 14 shows a flowchart illustrating a method 1400 that supports resource identification techniques for combining multiple instances of system information in accordance with aspects of the present disclosure. The operations of method 1400 may be implemented by a UE 115 or its components as described herein. For example, the operations of method 1400 may be performed by a communications manager as described with reference to FIGS. 6 to 9. In some examples, a UE may execute a set of instructions to control the functional elements of the UE to perform the functions described below. Additionally or alternatively, a UE may perform aspects of the functions described below using special-purpose hardware.

At 1405, the UE may identify a set of monitoring occasions available for transmission of RMSI scheduling information from a base station. The operations of 1405 may be performed according to the methods described herein. In some examples, aspects of the operations of 1405 may be performed by a RMSI configuration component as described with reference to FIGS. 6 to 9.

At 1410, the UE may determine, based on one or more parameters associated with at least a first monitoring occasion, two or more time locations, frequency locations, or combinations thereof, that are to be monitored for RMSI scheduling information. The operations of 1410 may be performed according to the methods described herein. In some examples, aspects of the operations of 1410 may be performed by an occasion identification component as described with reference to FIGS. 6 to 9. In some cases, the one or more parameters may include, for each of the set of monitoring occasions, one or more of an identification parameter associated with the base station or monitoring occasion; an index value associated with the monitoring occasion; a frequency parameter associated with the monitoring occasion; a RMSI multiplexing pattern; or any combinations thereof. In some cases, the UE may identify one or more candidate monitoring occasions for blind decoding of two or more instances of the RMSI scheduling information, which may be performed by a blind decoding component as described with reference to FIGS. 6 to 9.

At 1415, the UE may combine signals received in the two or more locations to generate a combined RMSI signal. The operations of 1415 may be performed according to the methods described herein. In some examples, aspects of the operations of 1415 may be performed by a soft buffer as described with reference to FIGS. 6 to 9.

At 1420, the UE may attempt to decode the combined signals to obtain the RMSI scheduling information. The operations of 1420 may be performed according to the methods described herein. In some examples, aspects of the operations of 1420 may be performed by a decoder as described with reference to FIGS. 6 to 9.

Figure 15:
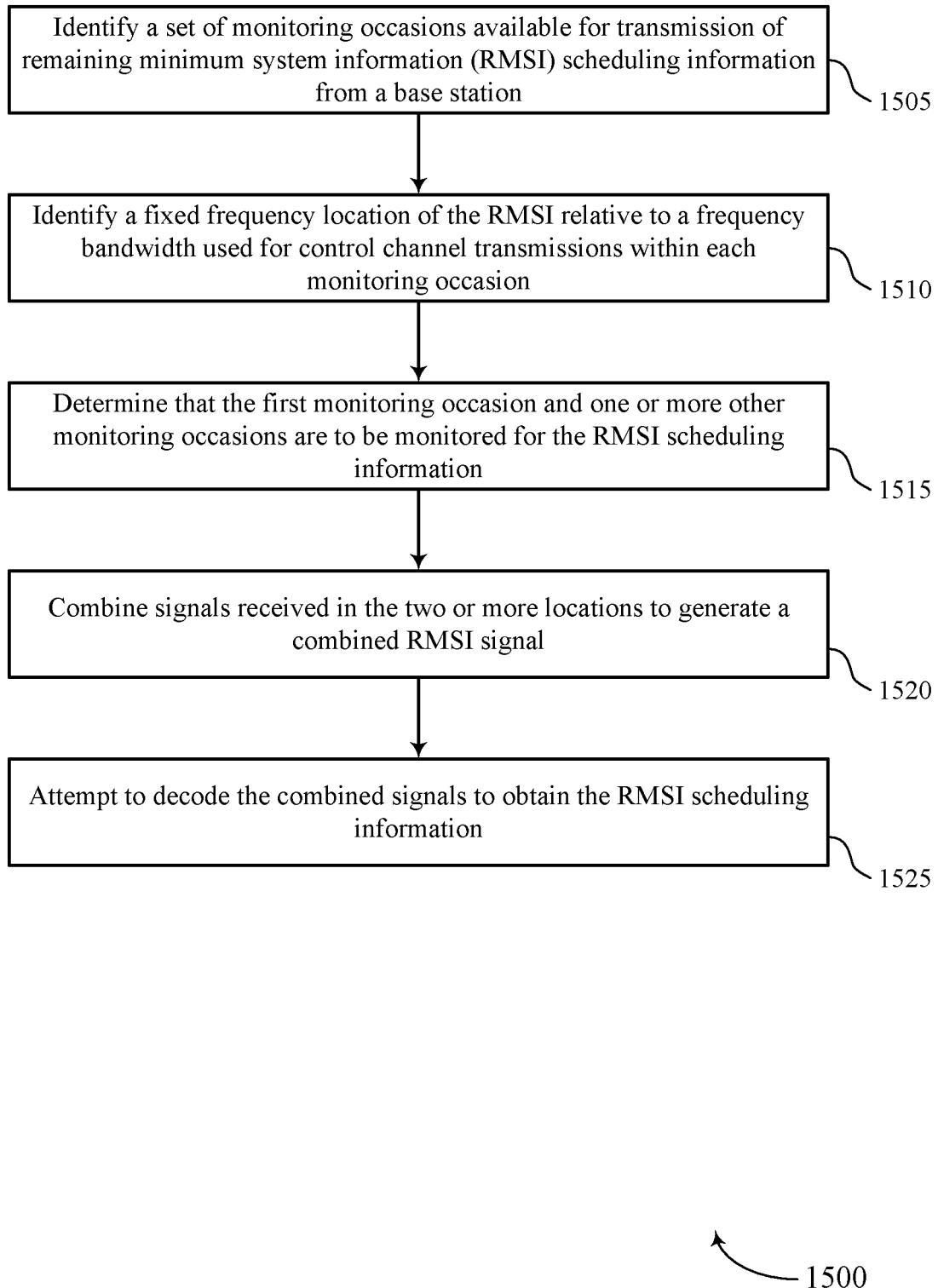

FIG. 15 shows a flowchart illustrating a method 1500 that supports resource identification techniques for combining multiple instances of system information in accordance with aspects of the present disclosure. The operations of method 1500 may be implemented by a UE 115 or its components as described herein. For example, the operations of method 1500 may be performed by a communications manager as described with reference to FIGS. 6 to 9. In some examples, a UE may execute a set of instructions to control the functional elements of the UE to perform the functions described below. Additionally or alternatively, a UE may perform aspects of the functions described below using special-purpose hardware.

At 1505, the UE may identify a set of monitoring occasions available for transmission of remaining minimum system information (RMSI) scheduling information from a base station. The operations of 1505 may be performed according to the methods described herein. In some examples, aspects of the operations of 1505 may be performed by a RMSI configuration component as described with reference to FIGS. 6 to 9.

At 1510, the UE may identify a fixed frequency location of the RMSI relative to a frequency bandwidth used for control channel transmissions within each monitoring occasion. The operations of 1510 may be performed according to the methods described herein. In some examples, aspects of the operations of 1510 may be performed by a frequency identification component as described with reference to FIGS. 6 to 9.

At 1515, the UE may determine that the first monitoring occasion and one or more other monitoring occasions are to be monitored for the RMSI scheduling information. The operations of 1515 may be performed according to the methods described herein. In some examples, aspects of the operations of 1515 may be performed by a frequency identification component as described with reference to FIGS. 6 to 9.

At 1520, the UE may combine signals received in the two or more locations to generate a combined RMSI signal. The operations of 1520 may be performed according to the methods described herein. In some examples, aspects of the operations of 1520 may be performed by a soft buffer as described with reference to FIGS. 6 to 9.

At 1525, the UE may attempt to decode the combined signals to obtain the RMSI scheduling information. The operations of 1525 may be performed according to the methods described herein. In some examples, aspects of the operations of 1525 may be performed by a decoder as described with reference to FIGS. 6 to 9.

Figure 16:
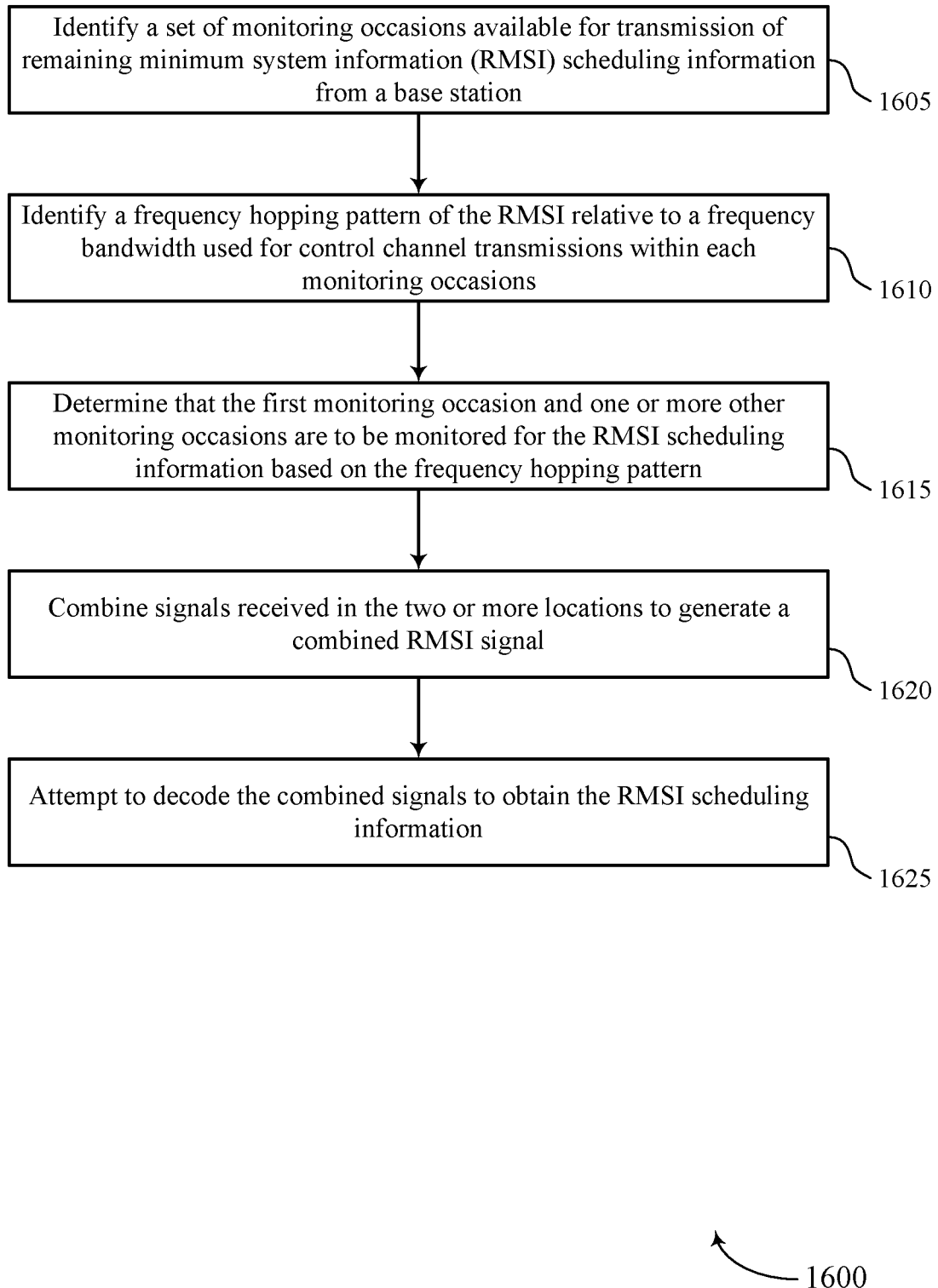

FIG. 16 shows a flowchart illustrating a method 1600 that supports resource identification techniques for combining multiple instances of system information in accordance with aspects of the present disclosure. The operations of method 1600 may be implemented by a UE 115 or its components as described herein. For example, the operations of method 1600 may be performed by a communications manager as described with reference to FIGS. 6 to 9. In some examples, a UE may execute a set of instructions to control the functional elements of the UE to perform the functions described below. Additionally or alternatively, a UE may perform aspects of the functions described below using special-purpose hardware.

At 1605, the UE may identify a set of monitoring occasions available for transmission of remaining minimum system information (RMSI) scheduling information from a base station. The operations of 1605 may be performed according to the methods described herein. In some examples, aspects of the operations of 1605 may be performed by a RMSI configuration component as described with reference to FIGS. 6 to 9.

At 1610, the UE may identify a frequency hopping pattern of the RMSI relative to a frequency bandwidth used for control channel transmissions within each monitoring occasions. The operations of 1610 may be performed according to the methods described herein. In some examples, aspects of the operations of 1610 may be performed by a hopping pattern component as described with reference to FIGS. 6 to 9.

At 1615, the UE may determine that the first monitoring occasion and one or more other monitoring occasions are to be monitored for the RMSI scheduling information based on the frequency hopping pattern. The operations of 1615 may be performed according to the methods described herein. In some examples, aspects of the operations of 1615 may be performed by a hopping pattern component as described with reference to FIGS. 6 to 9.

At 1620, the UE may combine signals received in the two or more locations to generate a combined RMSI signal. The operations of 1620 may be performed according to the methods described herein. In some examples, aspects of the operations of 1620 may be performed by a soft buffer as described with reference to FIGS. 6 to 9.

At 1625, the UE may attempt to decode the combined signals to obtain the RMSI scheduling information. The operations of 1625 may be performed according to the methods described herein. In some examples, aspects of the operations of 1625 may be performed by a decoder as described with reference to FIGS. 6 to 9.

Figure 17:
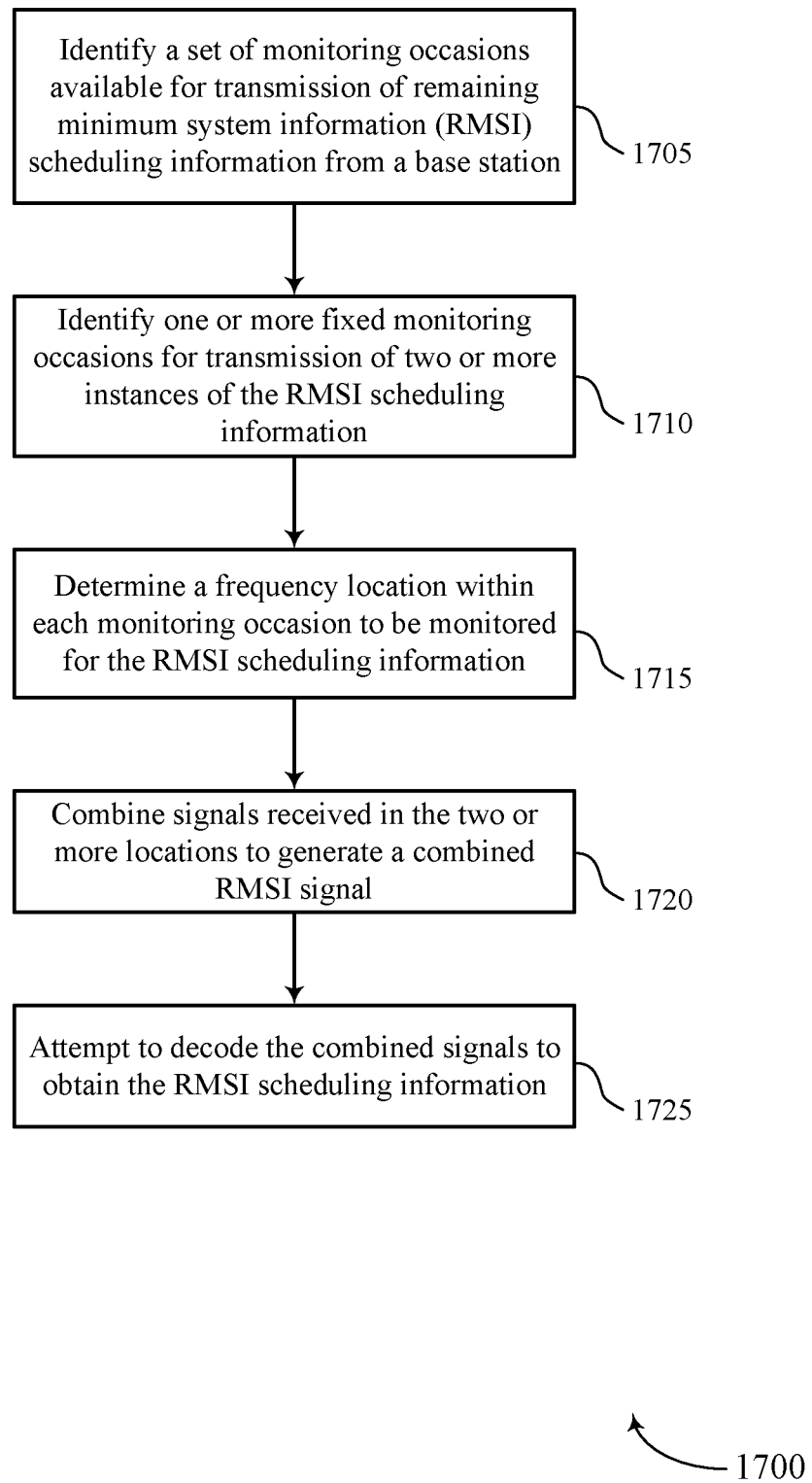

FIG. 17 shows a flowchart illustrating a method 1700 that supports resource identification techniques for combining multiple instances of system information in accordance with aspects of the present disclosure. The operations of method 1700 may be implemented by a UE 115 or its components as described herein. For example, the operations of method 1700 may be performed by a communications manager as described with reference to FIGS. 6 to 9. In some examples, a UE may execute a set of instructions to control the functional elements of the UE to perform the functions described below. Additionally or alternatively, a UE may perform aspects of the functions described below using special-purpose hardware.

At 1705, the UE may identify a set of monitoring occasions available for transmission of remaining minimum system information (RMSI) scheduling information from a base station. The operations of 1705 may be performed according to the methods described herein. In some examples, aspects of the operations of 1705 may be performed by a RMSI configuration component as described with reference to FIGS. 6 to 9.

At 1710, the UE may identify one or more fixed monitoring occasions for transmission of two or more instances of the RMSI scheduling information. The operations of 1710 may be performed according to the methods described herein. In some examples, aspects of the operations of 1710 may be performed by a monitoring configuration component as described with reference to FIGS. 6 to 9.

At 1715, the UE may determine a frequency location within each monitoring occasion to be monitored for the RMSI scheduling information. The operations of 1715 may be performed according to the methods described herein. In some examples, aspects of the operations of 1715 may be performed by a monitoring configuration component as described with reference to FIGS. 6 to 9.

At 1720, the UE may combine signals received in the two or more locations to generate a combined RMSI signal. The operations of 1720 may be performed according to the methods described herein. In some examples, aspects of the operations of 1720 may be performed by a soft buffer as described with reference to FIGS. 6 to 9.

At 1725, the UE may attempt to decode the combined signals to obtain the RMSI scheduling information. The operations of 1725 may be performed according to the methods described herein. In some examples, aspects of the operations of 1725 may be performed by a decoder as described with reference to FIGS. 6 to 9.

Figure 18:
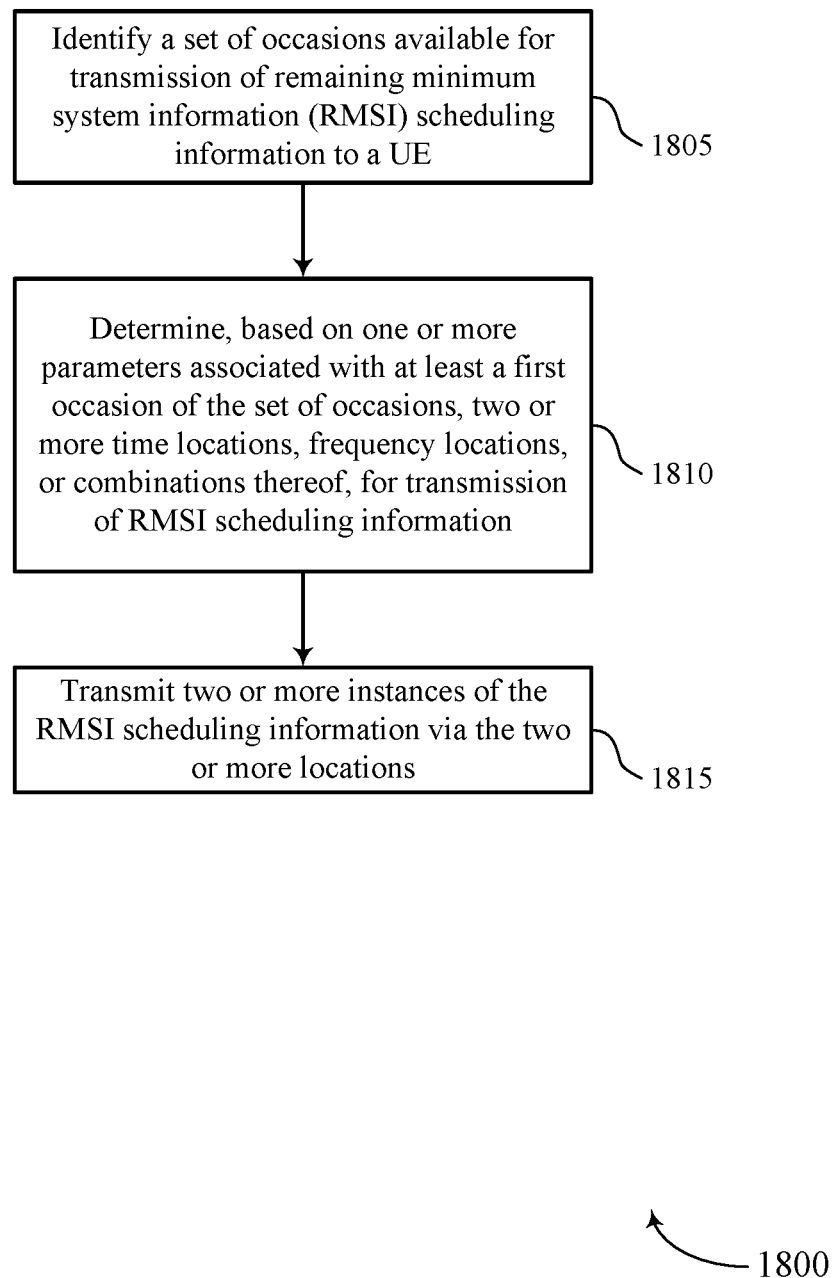

FIG. 18 shows a flowchart illustrating a method 1800 that supports resource identification techniques for combining multiple instances of system information in accordance with aspects of the present disclosure. The operations of method 1800 may be implemented by a base station 105 or its components as described herein. For example, the operations of method 1800 may be performed by a communications manager as described with reference to FIGS. 10 to 13. In some examples, a base station may execute a set of instructions to control the functional elements of the base station to perform the functions described below. Additionally or alternatively, a base station may perform aspects of the functions described below using special-purpose hardware.

At 1805, the base station may identify a set of occasions available for transmission of RMSI scheduling information to a UE. The operations of 1805 may be performed according to the methods described herein. In some examples, aspects of the operations of 1805 may be performed by a RMSI configuration component as described with reference to FIGS. 10 to 13.

At 1810, the base station may determine, based on one or more parameters associated with at least a first occasion of the set of occasions, two or more time locations, frequency locations, or combinations thereof, for transmission of RMSI scheduling information. The operations of 1810 may be performed according to the methods described herein. In some examples, aspects of the operations of 1810 may be performed by an occasion identification component as described with reference to FIGS. 10 to 13.

At 1815, the base station may transmit two or more instances of the RMSI scheduling information via the two or more locations. The operations of 1815 may be performed according to the methods described herein. In some examples, aspects of the operations of 1815 may be performed by a RMSI transmission component as described with reference to FIGS. 10 to 13.

Figure 19:
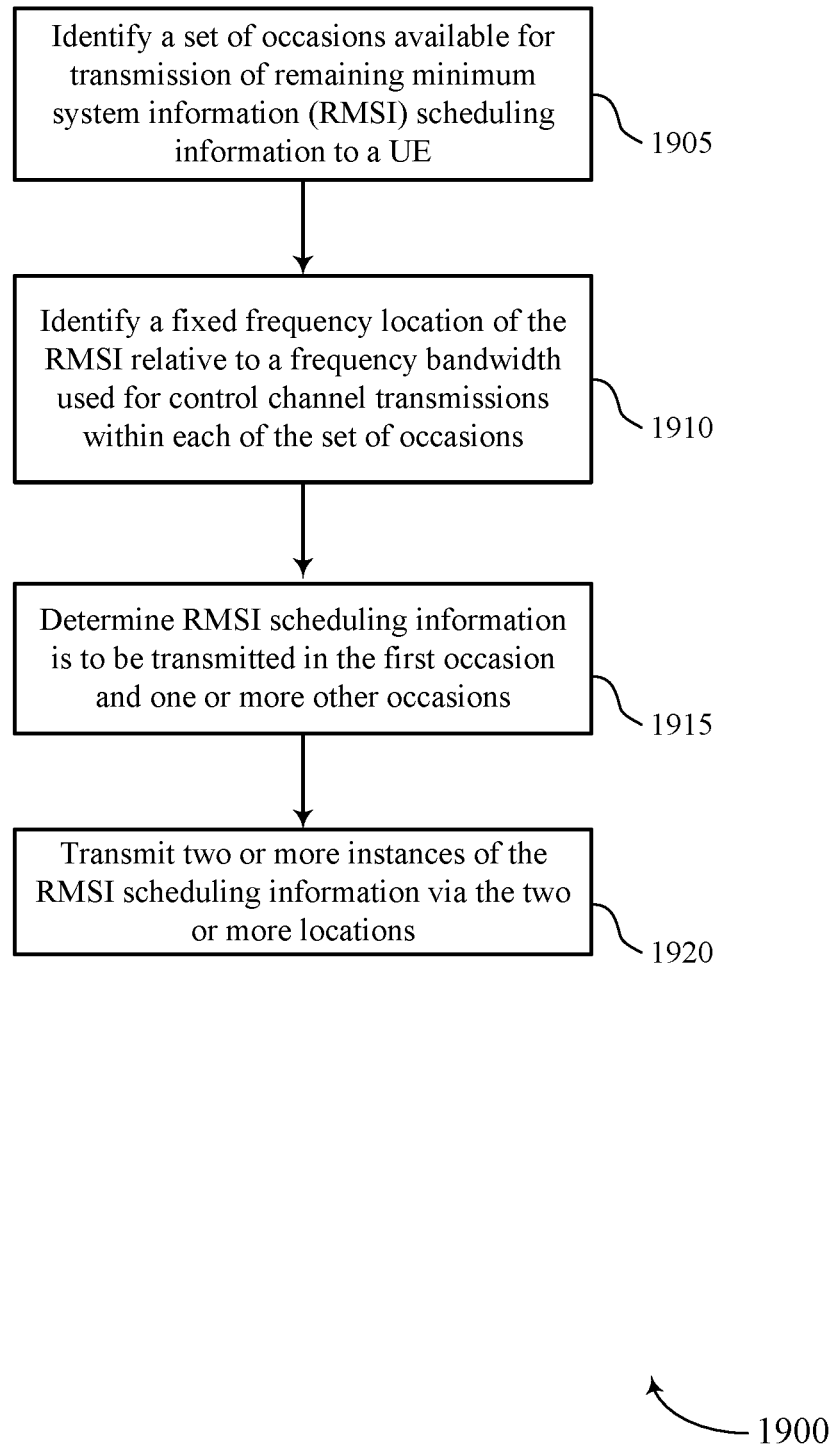

FIG. 19 shows a flowchart illustrating a method 1900 that supports resource identification techniques for combining multiple instances of system information in accordance with aspects of the present disclosure. The operations of method 1900 may be implemented by a base station 105 or its components as described herein. For example, the operations of method 1900 may be performed by a communications manager as described with reference to FIGS. 10 to 13. In some examples, a base station may execute a set of instructions to control the functional elements of the base station to perform the functions described below. Additionally or alternatively, a base station may perform aspects of the functions described below using special-purpose hardware.

At 1905, the base station may identify a set of occasions available for transmission of remaining minimum system information (RMSI) scheduling information to a UE. The operations of 1905 may be performed according to the methods described herein. In some examples, aspects of the operations of 1905 may be performed by a RMSI configuration component as described with reference to FIGS. 10 to 13.

At 1910, the base station may identify a fixed frequency location of the RMSI relative to a frequency bandwidth used for control channel transmissions within each of the set of occasions. The operations of 1910 may be performed according to the methods described herein. In some examples, aspects of the operations of 1910 may be performed by a frequency identification component as described with reference to FIGS. 10 to 13.

At 1915, the base station may determine RMSI scheduling information is to be transmitted in the first occasion and one or more other occasions. The operations of 1915 may be performed according to the methods described herein. In some examples, aspects of the operations of 1915 may be performed by a frequency identification component as described with reference to FIGS. 10 to 13.

At 1920, the base station may transmit two or more instances of the RMSI scheduling information via the two or more locations. The operations of 1920 may be performed according to the methods described herein. In some examples, aspects of the operations of 1920 may be performed by a RMSI transmission component as described with reference to FIGS. 10 to 13.

Figure 20:
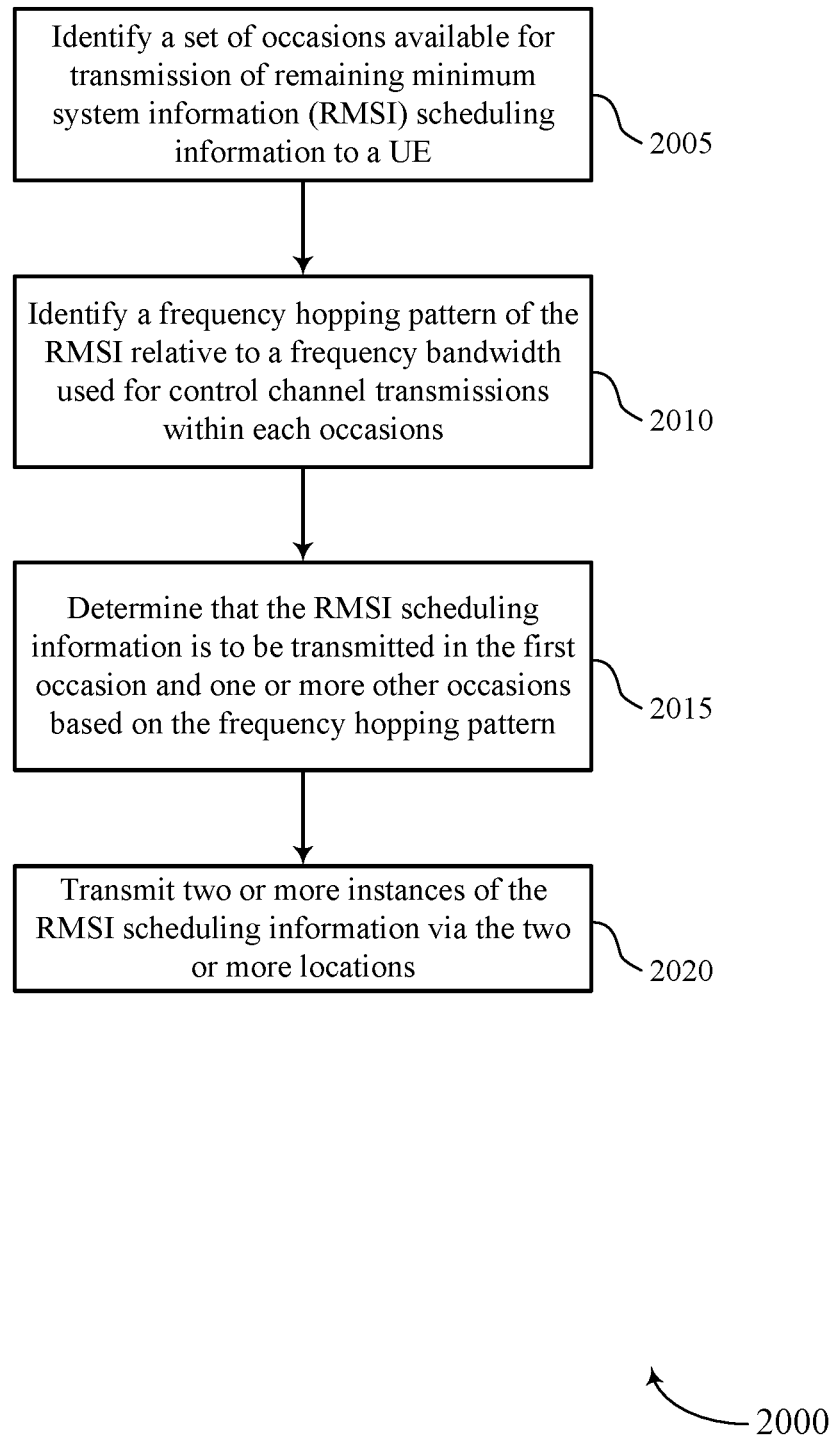

FIG. 20 shows a flowchart illustrating a method 2000 that supports resource identification techniques for combining multiple instances of system information in accordance with aspects of the present disclosure. The operations of method 2000 may be implemented by a base station 105 or its components as described herein. For example, the operations of method 2000 may be performed by a communications manager as described with reference to FIGS. 10 to 13. In some examples, a base station may execute a set of instructions to control the functional elements of the base station to perform the functions described below. Additionally or alternatively, a base station may perform aspects of the functions described below using special-purpose hardware.

At 2005, the base station may identify a set of occasions available for transmission of remaining minimum system information (RMSI) scheduling information to a UE. The operations of 2005 may be performed according to the methods described herein. In some examples, aspects of the operations of 2005 may be performed by a RMSI configuration component as described with reference to FIGS. 10 to 13.

At 2010, the base station may identify a frequency hopping pattern of the RMSI relative to a frequency bandwidth used for control channel transmissions within each occasions. The operations of 2010 may be performed according to the methods described herein. In some examples, aspects of the operations of 2010 may be performed by a hopping pattern component as described with reference to FIGS. 10 to 13.

At 2015, the base station may determine that the RMSI scheduling information is to be transmitted in the first occasion and one or more other occasions based on the frequency hopping pattern. The operations of 2015 may be performed according to the methods described herein. In some examples, aspects of the operations of 2015 may be performed by a hopping pattern component as described with reference to FIGS. 10 to 13.

At 2020, the base station may transmit two or more instances of the RMSI scheduling information via the two or more locations. The operations of 2020 may be performed according to the methods described herein. In some examples, aspects of the operations of 2020 may be performed by a RMSI transmission component as described with reference to FIGS. 10 to 13.

Figure 21:
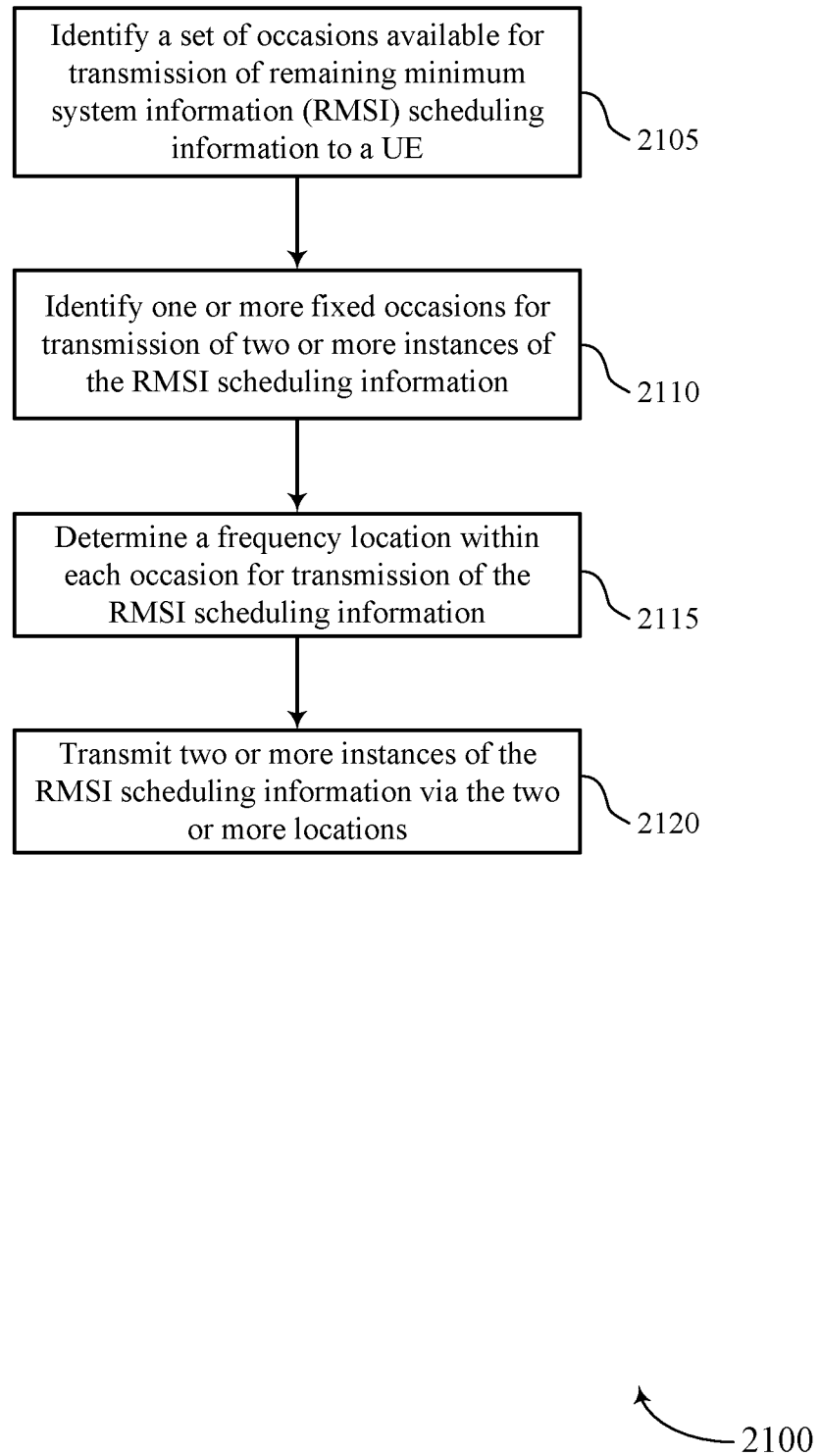

FIG. 21 shows a flowchart illustrating a method 2100 that supports resource identification techniques for combining multiple instances of system information in accordance with aspects of the present disclosure. The operations of method 2100 may be implemented by a base station 105 or its components as described herein. For example, the operations of method 2100 may be performed by a communications manager as described with reference to FIGS. 10 to 13. In some examples, a base station may execute a set of instructions to control the functional elements of the base station to perform the functions described below. Additionally or alternatively, a base station may perform aspects of the functions described below using special-purpose hardware.

At 2105, the base station may identify a set of occasions available for transmission of remaining minimum system information (RMSI) scheduling information to a UE. The operations of 2105 may be performed according to the methods described herein. In some examples, aspects of the operations of 2105 may be performed by a RMSI configuration component as described with reference to FIGS. 10 to 13.

At 2110, the base station may identify one or more fixed occasions for transmission of two or more instances of the RMSI scheduling information. The operations of 2110 may be performed according to the methods described herein. In some examples, aspects of the operations of 2110 may be performed by a fixed occasion configuration component as described with reference to FIGS. 10 to 13.

At 2115, the base station may determine a frequency location within each occasion for transmission of the RMSI scheduling information. The operations of 2115 may be performed according to the methods described herein. In some examples, aspects of the operations of 2115 may be performed by a fixed occasion configuration component as described with reference to FIGS. 10 to 13.

At 2120, the base station may transmit two or more instances of the RMSI scheduling information via the two or more locations. The operations of 2120 may be performed according to the methods described herein. In some examples, aspects of the operations of 2120 may be performed by a RMSI transmission component as described with reference to FIGS. 10 to 13.

Figure 22:
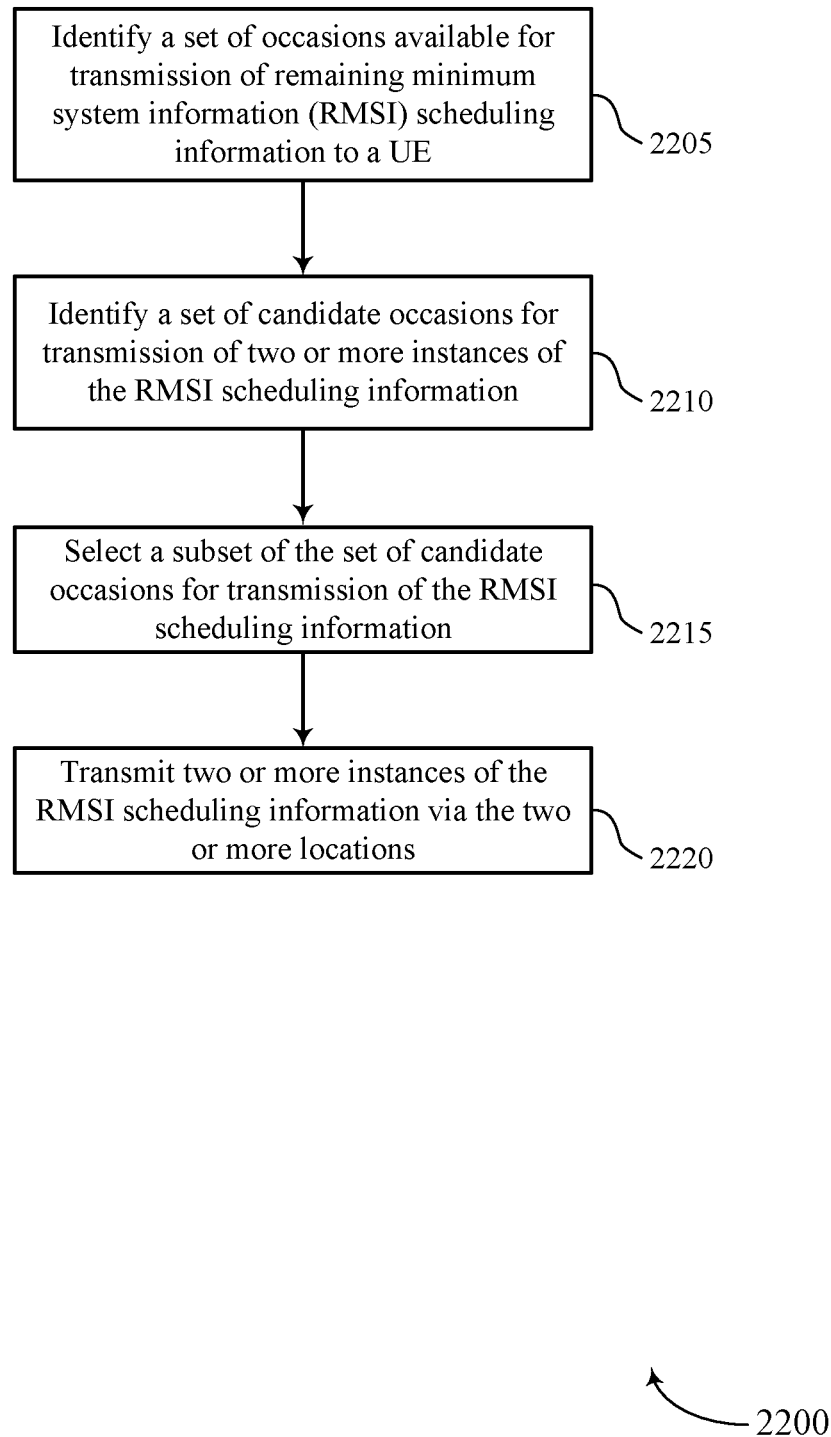

FIG. 22 shows a flowchart illustrating a method 2200 that supports resource identification techniques for combining multiple instances of system information in accordance with aspects of the present disclosure. The operations of method 2200 may be implemented by a base station 105 or its components as described herein. For example, the operations of method 2200 may be performed by a communications manager as described with reference to FIGS. 10 to 13. In some examples, a base station may execute a set of instructions to control the functional elements of the base station to perform the functions described below. Additionally or alternatively, a base station may perform aspects of the functions described below using special-purpose hardware.

At 2205, the base station may identify a set of occasions available for transmission of remaining minimum system information (RMSI) scheduling information to a UE. The operations of 2205 may be performed according to the methods described herein. In some examples, aspects of the operations of 2205 may be performed by a RMSI configuration component as described with reference to FIGS. 10 to 13.

At 2210, the base station may identify a set of candidate occasions for transmission of two or more instances of the RMSI scheduling information. The operations of 2210 may be performed according to the methods described herein. In some examples, aspects of the operations of 2210 may be performed by an occasion identification component as described with reference to FIGS. 10 to 13.

At 2215, the base station may select a subset of the set of candidate occasions for transmission of the RMSI scheduling information. The operations of 2215 may be performed according to the methods described herein. In some examples, aspects of the operations of 2215 may be performed by an occasion identification component as described with reference to FIGS. 10 to 13.

At 2220, the base station may transmit two or more instances of the RMSI scheduling information via the two or more locations. The operations of 2220 may be performed according to the methods described herein. In some examples, aspects of the operations of 2220 may be performed by a RMSI transmission component as described with reference to FIGS. 10 to 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a plurality of monitoring occasions available for transmission of remaining minimum system information (RMSI) scheduling information from a base station;
determining, based at least in part on one or more parameters associated with at least a first monitoring occasion, two or more time locations, frequency locations, or combinations thereof, that are to be monitored for RMSI scheduling information, wherein at least one of the frequency locations comprises a fixed frequency location of the RMSI scheduling information relative to a frequency bandwidth used for control channel transmissions within each monitoring occasion;
determining that the first monitoring occasion and one or more other monitoring occasions are to be monitored for the RMSI scheduling information;
combining signals received in the two or more time locations, frequency locations, or combinations thereof, to generate a combined RMSI signal; and
attempting to decode the combined RMSI signal to obtain the RMSI scheduling information.

2. The method of claim 1, wherein the RMSI scheduling information is carried in a physical downlink control channel (PDCCH) transmission.

3. The method of claim 1, wherein the plurality of monitoring occasions available for transmission of RMSI scheduling information are scheduled by a physical broadcast channel (PBCH) transmission associated with a given synchronization signal block (SSB) ID.

4. The method of claim 1, wherein the one or more parameters include, for each of the plurality of monitoring occasions, one or more of an identification parameter associated with the base station or monitoring occasion; an index value associated with the monitoring occasion; a frequency parameter associated with the monitoring occasion; a RMSI multiplexing pattern; or any combinations thereof.

5. The method of claim 1, wherein the fixed frequency location of the RMSI scheduling information indicates based at least in part on an aggregation level for RMSI scheduling information transmissions, an index value of a control channel used to transmit the RMSI scheduling information, or combinations thereof.

6. The method of claim 1, wherein the fixed frequency location of the RMSI scheduling information indicates based at least in part on a starting control channel element (CCE) index of a control channel transmission containing the RMSI scheduling information.

7. The method of claim 1, wherein the fixed frequency location of the RMSI scheduling information is determined based at least in part on a set of occupied resource element groups (REGs) of a control resource set containing the RMSI scheduling information.

8. The method of claim 1, wherein the determining comprises:
identifying one or more fixed monitoring occasions for transmission of two or more instances of the RMSI scheduling information; and
determining a frequency location within each monitoring occasion to be monitored for the RMSI scheduling information.

9. The method of claim 8, wherein the one or more fixed monitoring occasions are identified based at least in part on a configured multiplexing pattern of monitoring occasions.

10. The method of claim 8, wherein the one or more fixed monitoring occasions are identified based at least in part on a predetermined pattern of monitoring occasions within a time window.

11. The method of claim 1, wherein the determining comprises:
identifying one or more candidate monitoring occasions for transmission of two or more instances of the RMSI scheduling information; and
blind decoding each of the one or more candidate monitoring occasions to determine a presence of RMSI.

12. The method of claim 11, wherein the one or more candidate monitoring occasions are a subset of the plurality of monitoring occasions based at least in part on a number of occasions RMSI is transmitted during a time window.

13. The method of claim 1, wherein the RMSI scheduling information has a known frequency location within each monitoring occasion and a partially known time location within monitoring occasions, has a fixed time location within monitoring occasions and a partially known frequency location within each monitoring occasion, or combinations thereof.

14. A method for wireless communication, comprising:
identifying a plurality of occasions available for transmission of remaining minimum system information (RMSI) scheduling information to a user equipment (UE);
determining, based at least in part on one or more parameters associated with at least a first occasion of the plurality of occasions, two or more time locations, frequency locations, or combinations thereof, for transmission of RMSI scheduling information;
identifying a fixed frequency location of the RMSI relative to a frequency bandwidth used for control channel transmissions within each of the plurality of occasions; and
determining RMSI scheduling information is to be transmitted in the first occasion and one or more other occasions; and
transmitting two or more instances of the RMSI scheduling information via the two or more time locations, frequency locations, or combinations thereof.

15. The method of claim 14, wherein the one or more parameters include, for each of the plurality of occasions, one or more of an identification parameter associated with a base station or occasion; an index value associated with the occasion; a frequency parameter associated with the occasion; or any combinations thereof.

16. The method of claim 14, wherein the determining comprises:
identifying one or more fixed occasions for transmission of two or more instances of the RMSI scheduling information; and
determining a frequency location within each occasion for transmission of the RMSI scheduling information.

17. An apparatus for wireless communication, comprising:
a processor,
memory in electronic communication with the processor; and
instructions stored in the memory and executable by the processor to cause the apparatus to:
identify a plurality of monitoring occasions available for transmission of remaining minimum system information (RMSI) scheduling information from a base station;
determine, based at least in part on one or more parameters associated with at least a first monitoring occasion, two or more time locations, frequency locations, or combinations thereof, that are to be monitored for RMSI scheduling information, wherein at least one of the frequency locations comprises a fixed frequency location of the RMSI scheduling information relative to a frequency bandwidth used for control channel transmissions within each monitoring occasion;
determine that the first monitoring occasion and one or more other monitoring occasions are to be monitored for the RMSI scheduling information;
combine signals received in the two or more time locations, frequency locations, or combinations thereof, to generate a combined RMSI signal;
attempt to decode the combined RMSI signal to obtain the RMSI scheduling information.

18. The apparatus of claim 17, wherein the one or more parameters include, for each of the plurality of monitoring occasions, one or more of an identification parameter associated with the base station or monitoring occasion; an index value associated with the monitoring occasion; a frequency parameter associated with the monitoring occasion; a RMSI multiplexing pattern; or any combinations thereof.

19. An apparatus for wireless communication, comprising:
a processor,
memory in electronic communication with the processor; and
instructions stored in the memory and executable by the processor to cause the apparatus to:
identify a plurality of occasions available for transmission of remaining minimum system information (RMSI) scheduling information to a user equipment (UE);

determine, based at least in part on one or more parameters associated with at least a first occasion of the plurality of occasions, two or more time locations, frequency locations, or combinations thereof, for transmission of RMSI scheduling information;

identify a fixed frequency location of the RMSI relative to a frequency bandwidth used for control channel transmissions within each of the plurality of occasions; and determine RMSI scheduling information is to be transmitted in the first occasion and one or more other occasions; and transmit two or more instances of the RMSI scheduling information via the two or more time locations, frequency locations, or combinations thereof.

20. The apparatus of claim 19, wherein the one or more parameters include, for each of the plurality of occasions, one or more of an identification parameter associated with a base station or occasion; an index value associated with the occasion; a frequency parameter associated with the occasion; a RMSI multiplexing pattern; or any combinations thereof.

21. The method of claim 1, wherein the fixed frequency location of the RMSI scheduling information is predefined.

22. The method of claim 1, wherein determining the two or more time locations, frequency locations, or combinations thereof further comprises:

receiving a synchronization signal block (SSB) that includes a master information block (MIB) that identifies the fixed frequency location of the RMSI scheduling information.

23. The method of claim 14, wherein the fixed frequency location of the RMSI scheduling information is predefined.

24. The method of claim 14, wherein identifying the fixed frequency location further comprises:

receiving a synchronization signal block (SSB) that includes a master information block (MIB) that identifies the fixed frequency location of the RMSI scheduling information.

25. The apparatus of claim 17, wherein the fixed frequency location of the RMSI scheduling information is predefined.

26. The apparatus of claim 17, wherein determine the two or more time locations, frequency locations, or combinations thereof further comprises:

receive a synchronization signal block (SSB) that includes a master information block (MIB) that identifies the fixed frequency location of the RMSI scheduling information.

27. The apparatus of claim 19, wherein the fixed frequency location of the RMSI scheduling information is predefined.

28. The apparatus of claim 19, wherein identify the fixed frequency location further comprises:

receive a synchronization signal block (SSB) that includes a master information block (MIB) that identifies the fixed frequency location of the RMSI scheduling information.

\* \* \* \* \*